(12) United States Patent
Lee et al.

(10) Patent No.: US 9,661,317 B2
(45) Date of Patent: May 23, 2017

(54) METHOD OF DISPLAYING A STEREOSCOPIC IMAGE AND DISPLAY DEVICE

(71) Applicant: Samsung Display Co., Ltd., Yongin-si, Gyeonggi-do (KR)

(72) Inventors: Jae-Hoon Lee, Seoul (KR); Jung-Taek Kim, Seoul (KR); Woo-Chul Kim, Seoul (KR); Seung-Ho Park, Suwon-si (KR); Jae-Woo Song, Anyang-si (KR); Hae-Goo Jung, Seongnam-si (KR)

(73) Assignee: Samsung Display Co., Ltd., Gyeonggi-do (KR)

(*) Notice: Subject to any disclaimer, the term of this patent is extended or adjusted under 35 U.S.C. 154(b) by 49 days.

(21) Appl. No.: 14/869,841

(22) Filed: Sep. 29, 2015

(65) Prior Publication Data
US 2016/0182901 A1 Jun. 23, 2016

(30) Foreign Application Priority Data

Dec. 18, 2014 (KR) .......................... 10-2014-0182882

(51) Int. Cl.
*G09G 5/00* (2006.01)
*H04N 13/04* (2006.01)
(Continued)

(52) U.S. Cl.
CPC ......... *H04N 13/0497* (2013.01); *G09G 3/003* (2013.01); *G09G 3/3406* (2013.01); *H04N 13/0438* (2013.01)

(58) Field of Classification Search
CPC .. H04N 13/0497; G09G 3/003; G09G 3/3406; G09G 3/36
(Continued)

(56) References Cited

U.S. PATENT DOCUMENTS

2012/0139820 A1 6/2012 Senda et al.
2013/0033587 A1 2/2013 Kase et al.
(Continued)

FOREIGN PATENT DOCUMENTS

KR 10-2012-0044040 A 5/2012
KR 10-2012-0065717 A 6/2012
(Continued)

OTHER PUBLICATIONS

Extended European Search Report dated Apr. 26, 2016 for European Patent Application No. EP 15 172 980.3 which corresponds to subject U.S. Appl. No. 14/869,841.

*Primary Examiner* — Calvin C Ma
(74) *Attorney, Agent, or Firm* — Knobbe Martens Olson & Bear LLP

(57) ABSTRACT

A method of displaying a stereoscopic image and a display device are disclosed. In one aspect, the method includes first providing a first portion of left eye image data to a plurality of pixel rows during a first non-emission period of a first frame period, wherein the first frame period includes a first emission period having a first emission transition period and a first compensation period. The method also includes second providing a second portion of the left eye image data to the pixel rows during the first emission transition period while sequentially providing the left eye image data to the pixel rows during the first emission period. The method further includes third providing the second portion of the left eye image data to the pixel rows during the first compensation period and driving the pixel rows to concurrently emit light during the first emission period.

20 Claims, 17 Drawing Sheets

(51) Int. Cl.
*G09G 3/00* (2006.01)
*G09G 3/34* (2006.01)

(58) Field of Classification Search
USPC .............................................. 349/7, 204, 690
See application file for complete search history.

(56) References Cited

U.S. PATENT DOCUMENTS

2013/0155124 A1  6/2013  Tsuge
2014/0022360 A1  1/2014  Yanai
2015/0170561 A1  6/2015  Ahn et al.
2015/0222889 A1  8/2015  Kim et al.

FOREIGN PATENT DOCUMENTS

METHOD OF DISPLAYING A STEREOSCOPIC IMAGE AND DISPLAY DEVICE

INCORPORATION BY REFERENCE TO ANY PRIORITY APPLICATIONS

This application claims priority under 35 USC §119 to Korean Patent Applications No. 10-2014-0182882, filed on Dec. 18, 2014 in the Korean Intellectual Property Office (KIPO), the contents of which are incorporated herein in its entirety by reference.

BACKGROUND

Field

The described technology generally relates to methods of displaying stereoscopic images and display devices displaying stereoscopic images.

Description of the Related Technology

In a stereoscopic image display technique, a stereoscopic image (or a three-dimensional (3D) image) can be implemented using binocular parallax that provides a three-dimensional effect. Such stereoscopic display device displays the stereoscopic image by providing different images to the left and right eyes of a viewer (with or without glasses). As one type of the stereoscopic display device using glasses, a shutter technology has been widely used which opens the left eye piece of the shutter glasses when displaying the left eye image and opens the right eye piece of the shutter glasses when displaying the right eye image.

SUMMARY OF CERTAIN INVENTIVE ASPECTS

Some inventive aspects relate to a method of displaying a stereoscopic image that can prevent degradation of image quality and a display device that can perform the same.

Another aspect is a method of displaying a stereoscopic image at a display device having a display panel including a plurality of pixel rows. In the method, a first portion of left eye image data are written beforehand o the plurality of pixel rows during a first non-emission period of a first frame period, a second portion of the left eye image data are written again to the plurality of pixel rows during a portion of a first emission period of the first frame period while the left eye image data being sequentially written to the plurality of pixel rows during the first emission period where the second portion of the left eye image data are written during a first emission transition period, the plurality of pixel rows are driven to simultaneously emit light during the first emission period, a first portion of right eye image data are written beforehand o the plurality of pixel rows during a second non-emission period of a second frame period, a second portion of the right eye image data are written again to the plurality of pixel rows during a portion of a second emission period of the second frame period while the right eye image data being sequentially written to the plurality of pixel rows during the second emission period where the second portion of the right eye image data are written during a second emission transition period, and the plurality of pixel rows are driven to simultaneously emit light during the second emission period.

In example embodiments, each of the first emission transition period and the second emission transition period corresponds to a transition time from non-emission to emission.

In example embodiments, the display device drives the display panel by dividing one frame period into first through N-th sub-frame periods, where N is an integer greater than one, and to write beforehand the first portion of the left eye image data to the plurality of pixel rows, left eye image data to be written during the N-th sub-frame of the first frame period are written to the plurality of pixel rows during the first non-emission period of the first frame period and first and second power supply voltages having a first voltage difference are applied simultaneously to the plurality of pixel rows during the first non-emission period such that the plurality of pixel rows do not emit light. To write beforehand the first portion of the right eye image data to the plurality of pixel rows, right eye image data to be written during the N-th sub-frame of the second frame period are written to the plurality of pixel rows during the second non-emission period of the second frame period and the first and second power supply voltages having the first voltage difference are applied simultaneously to the plurality of pixel rows during the second non-emission period such that the plurality of pixel rows do not emit light.

To write sequentially the left eye image data to the plurality of pixel rows during the first emission period, the left eye image data are sequentially written to the plurality of pixel rows during respective first through N-th sub-frame periods of the first emission period and the second portion of the left eye image data are written again to the plurality of pixel rows during a first compensation period of the first frame period. To write sequentially the right eye image data to the plurality of pixel rows during the second emission period, the right eye image data are sequentially to the plurality of pixel rows during respective first through N-th sub-frame periods of the second emission period and the second portion of the right eye image data are written again to the plurality of pixel rows during a second compensation period of the second frame period.

To drive the plurality of pixel rows to simultaneously emit light during the first emission period, the first and second power supply voltages having a second voltage difference greater than the first voltage difference are applied simultaneously to the plurality of pixel rows during the first emission period such that the plurality of pixel rows emit light. To drive the plurality of pixel rows to simultaneously emit light during the second emission period, the first and second power supply voltages having the second voltage difference greater are applied simultaneously to the plurality of pixel rows during the second emission period such that the plurality of pixel rows emit light.

The first power supply voltage can is a high power supply voltage, and the second power supply voltage can is a low power supply voltage. The low power supply voltage falls from a high voltage level to a low voltage level at a start time point of the first emission period, and falls from the high voltage level to the low voltage level at a start time point of the second emission period.

Each of the first emission transition period and the second emission transition period corresponds to a falling time during which the low power supply voltage falls from the high voltage level to the low voltage level.

Each of the first compensation period and the second compensation period includes at least a rising time during which the low power supply voltage rises from the low voltage level to the high voltage level.

In example embodiments, the display device drives the display panel by dividing one frame period into first through N-th sub-frame periods, where N is an integer greater than one. To write beforehand the first portion of the left eye image data to the plurality of pixel rows, left eye image data to be written during the N-th sub-frame of the first frame period are written to the plurality of pixel rows during the first non-emission period of the first frame period and a emission control signal having a first voltage level is applied simultaneously to the plurality of pixel rows during the first non-emission period such that the plurality of pixel rows do not emit light. To write beforehand the first portion of the right eye image data to the plurality of pixel rows, right eye image data to be written during the N-th sub-frame of the second frame period are written to the plurality of pixel rows during the second non-emission period of the second frame period and the emission control signal having the first voltage level is applied simultaneously to the plurality of pixel rows during the second non-emission period such that the plurality of pixel rows do not emit light.

To drive the plurality of pixel rows to simultaneously emit light during the first emission period, the emission control signal having a second voltage level different from the first voltage level is applied to the plurality of pixel rows during the first emission period such that the plurality of pixel rows emit light. To drive the plurality of pixel rows to simultaneously emit light during the second emission period, the emission control signal having the second voltage level is applied to the plurality of pixel rows during the second emission period such that the plurality of pixel rows emit light.

Each of the first emission transition period and the second emission transition period corresponds to a first transition time during which the emission control signal transits from the first voltage level to the second voltage level.

Each of the first compensation period and the second compensation period includes at least a second transition time during which the emission control signal transits from the second voltage level to the first voltage level.

In example embodiments, the display panel includes an upper display panel having upper pixel rows of the plurality of pixel rows and a lower display panel having lower pixel rows of the plurality of pixel rows, and the upper display panel and the lower display panel are respectively driven by different data drivers.

The first portion of the left eye image data, the left eye image data, the first portion of the right eye image data and the right eye image data are sequentially written to the upper pixel rows in a first direction from top to bottom of the upper display panel. The first portion of the left eye image data, the left eye image data, the first portion of the right eye image data and the right eye image data are sequentially written to the lower pixel rows in the first direction from top to bottom of the lower display panel.

The first portion of the left eye image data, the left eye image data, the first portion of the right eye image data and the right eye image data are sequentially written to the upper pixel rows in a first direction from top to bottom of the upper display panel. The first portion of the left eye image data, the left eye image data, the first portion of the right eye image data and the right eye image data are sequentially written to the upper pixel rows in a second direction from bottom to top of the lower display panel.

In example embodiments, at least the left eye image data and the right eye image data are written to the plurality of pixel rows in a progressive emission with simultaneous scan (PESS) method.

Another aspect is a display device that includes a display panel including a plurality of pixel rows, and a driving circuit. The driving circuit is configured to write beforehand a first portion of left eye image data to the plurality of pixel rows during a first non-emission period of a first frame period, to write again a second portion of the left eye image data to the plurality of pixel rows during a portion of a first emission period of the first frame period while sequentially writing the left eye image data to the plurality of pixel rows during the first emission period, where the second portion of the left eye image data is written during a first emission transition period, to drive the plurality of pixel rows to simultaneously emit light during the first emission period, to write beforehand a first portion of right eye image data to the plurality of pixel rows during a second non-emission period of a second frame period, to write again a second portion of the right eye image data to the plurality of pixel rows during a portion of a second emission period of the second frame period while sequentially writing the right eye image data to the plurality of pixel rows during the second emission period, where the second portion of the right eye image data is written during a second emission transition period, and to drive the plurality of pixel rows to simultaneously emit light during the second emission period.

In example embodiments, each of the first emission transition period and the second emission transition period corresponds to a transition time from non-emission to emission.

In example embodiments, the driving circuit includes a power supply. The power supply is configured to apply first and second power supply voltages having a first voltage difference to the plurality of pixel rows during each of the first and second non-emission periods such that the plurality of pixel rows do not emit light and to apply the first and second power supply voltages having a second voltage difference greater than the first voltage difference to the plurality of pixel rows during each of the first and second emission periods such that the plurality of pixel rows emit light. The driving circuit can adjust a start time point of rising time of the second power supply voltage during which the second portion of the left eye image data and the second portion of the left eye image data are respectively written again to the plurality of pixel rows.

In example embodiments, the driving circuit includes an emission control driver. The emission control driver is configured to apply simultaneously a emission control signal having a first voltage level to the plurality of pixel rows during each of the first and second non-emission periods such that the plurality of pixel rows do not emit light, and to apply the emission control signal having a second voltage level different from the first voltage level to the plurality of pixel rows during each of the first and second emission periods such that the plurality of pixel rows emit light. The driving circuit can adjust a start time point of rising time of the emission control signal during which the second portion of the left eye image data and the second portion of the right eye image data are respectively written again to the plurality of pixel rows.

Another aspect is a method of displaying a stereoscopic image at a display device having a display panel including a plurality of pixel rows, the method comprising first providing a first portion of left eye image data to a plurality of pixel rows during a first non-emission period of a first frame period, wherein the first frame period includes a first emission period having a first emission transition period and a first compensation period. The method also comprises second providing a second portion of the left eye image data to the pixel rows during the first emission transition period while sequentially providing the left eye image data to the pixel rows during the first emission period, third providing the second portion of the left eye image data to the pixel rows during the first compensation period, driving the pixel rows to concurrently emit light during the first emission period, fourth providing a first portion of right eye image data to the pixel rows during a second non-emission period of a second frame period, wherein the second frame period includes a second emission period having a second emission transition period and a second compensation period, fifth providing a second portion of the right eye image data to the pixel rows during the second emission transition period while sequentially providing the right eye image data to the pixel rows during the second emission period, sixth providing the second portion of the right eye image data to the pixel rows during the second compensation period, and driving the pixel rows to concurrently emit light during the second emission period.

In the above method, the first and second emission transition periods correspond to a transition time from non-emission to emission respectively in the first and second frame periods.

In the above method, the display device is configured divide each of the first and second frame periods into first through N-th sub-frame periods, where N is an integer greater than 1. In the above method, the first providing includes providing left eye image data to be written during the N-th sub-frame of the first frame period to the pixel rows during the first non-emission period and applying concurrently first and second power supply voltages having a first voltage difference to the pixel rows during the first non-emission period such that the pixel rows do not emit light. In the above method, the fourth providing includes providing right eye image data to be written during the N-th sub-frame of the second frame period to the pixel rows and applying concurrently the first and second power to the pixel rows during the second non-emission period such that the pixel rows do not emit light.

In the above method, sequentially providing the left eye image data to the pixel rows during the first emission period includes sequentially providing the left eye image data to the pixel rows during first through N-th sub-frame periods of the first emission period, wherein sequentially providing the right eye image data to the pixel rows during the second emission period includes sequentially providing the right eye image data to the pixel rows during first through N-th sub-frame periods of the second emission period.

In the above method, driving the pixel rows to concurrently emit light during the first emission period includes applying concurrently the first and second power supply voltages having a second voltage difference greater than the first voltage difference to the pixel rows during the first emission period such that the pixel rows emit light, wherein driving the pixel rows to concurrently emit light during the second emission period includes concurrently applying the first and second power supply voltages having the second voltage difference to the pixel rows during the second emission period such that the pixel rows emit light.

In the above method, the display device further includes a power supply configured to supply the first and second power supply voltages, wherein power supply is configured to i) lower the second power supply voltage from a first voltage level to a second voltage level less than the first voltage level at the beginning of the first emission period, and ii) lower the second power supply voltage from the first voltage level to the second voltage level at the beginning of the second emission period.

In the above method, each of the first and second emission transition periods corresponds to a falling time during which the second power supply voltage is lowered from the first voltage level to the second voltage level.

In the above method, each of the first and second compensation periods includes at least a rising time during which the second power supply voltage rises from the second voltage level to the first voltage level.

In the above method, the display device is configured to divide each of the first and second frame periods into first through N-th sub-frame periods, where N is an integer greater than 1, wherein the first providing includes providing left eye image data to be written during the N-th sub-frame of the first frame period to the pixel rows and applying concurrently an emission control signal having a first voltage level to the pixel rows during the first non-emission period such that the pixel rows do not emit light. In the above method, the fourth providing includes providing right eye image data to be written during the N-th sub-frame of the second frame period to the pixel rows and applying concurrently the emission control signal having the first voltage level to the pixel rows during the second non-emission period such that the pixel rows do not emit light.

In the above method, driving the pixel rows to concurrently emit light during the first emission period includes applying the emission control signal having a second voltage level different from the first voltage level to the pixel rows during the first emission period such that the pixel rows emit light, wherein driving the pixel rows to concurrently emit light during the second emission period includes applying the emission control signal having the second voltage level to the pixel rows during the second emission period such that the pixel rows emit light.

In the above method, each of the first and second emission transition periods corresponds to a first transition time during which the emission control signal transitions from the first voltage level to the second voltage level.

In the above method, each of the first and second compensation periods includes at least a second transition time during which the emission control signal transitions from the second voltage level to the first voltage level.

In the above method, the display panel includes an upper display panel having upper pixel rows of the pixel rows and a lower display panel having lower pixel rows of the pixel rows, wherein the upper and lower display panels are configured to be respectively driven based on different data drivers.

In the above method, the first portion of the left eye image data, the left eye image data, the first portion of the right eye image data and the right eye image data are configured to be sequentially written to the upper pixel rows in a first direction extending from a top to a bottom of the upper display panel, wherein the first portion of the left eye image data, the left eye image data, the first portion of the right eye image data and the right eye image data are configured to be sequentially written to the lower pixel rows in the first direction.

In the above method, the first portion of the left eye image data, the left eye image data, the first portion of the right eye image data and the right eye image data are configured to be sequentially written to the upper pixel rows in a first direction from a top to a bottom of the upper display panel, wherein the first portion of the left eye image data, the left eye image data, the first portion of the right eye image data and the right eye image data are configured to be sequentially written to the upper pixel rows in a second direction from a bottom to a top of the lower display panel.

In the above method, at least the left and right eye image data are written to the pixel rows in a progressive emission with simultaneous scan (PESS) method.

Another aspect is a display device comprising a display panel including a plurality of pixel rows and a driving circuit. The driving circuit is configured to provide left eye image data to the pixel rows during a first non-emission period of a first frame period, wherein the first frame period includes a first emission period having a first emission transition period. The driving circuit is further configured to concurrently provide a portion of the left eye image data to the pixel rows during the first emission transition period and sequentially provide the left eye image data to the pixel rows during the first emission period, drive the pixel rows to concurrently emit light during the first emission period, and provide right eye image data to the pixel rows during a second non-emission period of a second frame period, wherein the second frame period includes a second emission period having a second emission transition period. The driving circuit is further configured to concurrently provide a portion of the right eye image data to the pixel rows during the second emission transition period and sequentially provide the right eye image data to the pixel rows during the second emission period. The driving circuit is further configured to drive the pixel rows to concurrently emit light during the second emission period.

In the above display device, each of the first and second emission transition periods corresponds to a transition time from non-emission to emission of the display panel.

In the above display device, the driving circuit includes a power supply configured to apply first and second power supply voltages having a first voltage difference to the pixel rows during each of the first and second non-emission periods such that the pixel rows do not emit light and apply the first and second power supply voltages having a second voltage difference greater than the first voltage difference to the pixel rows during each of the first and second emission periods such that the pixel rows emit light. In the above display device, the driving circuit is further configured to adjust a start time point of a rising time of the second power supply voltage during which the portions of the left and right eye image data are respectively written again to the pixel rows.

In the above display device, the driving circuit includes an emission control driver configured to apply concurrently a emission control signal having a first voltage level to the pixel rows during each of the first and second non-emission periods such that the pixel rows do not emit light and apply the emission control signal having a second voltage level different from the first voltage level to the pixel rows during each of the first and second emission periods such that the pixel rows emit light. In the above display device, the driving circuit is further configured to adjust a start time point of a rising time of the emission control signal during which the portions of the left and right eye image data are respectively written again to the pixel rows.

According to at least one of the disclosed embodiments, a portion of the image data is written in advance during a non-emission period, and image data, written already during an emission transition period, is written again during a compensation period while the image data is sequentially written during an emission period without same image data being overwritten during two consecutive frame periods. Therefore, the display device can display the stereoscopic images while maintaining a number of sub-frames and can prevent the occurrence of the band phenomenon that a luminance decreases in a portion of the display panel.

BRIEF DESCRIPTION OF THE DRAWINGS

FIG. 6 is a diagram for describing a method of writing data to pixel rows in a display device according to example embodiments.

DETAILED DESCRIPTION OF CERTAIN INVENTIVE EMBODIMENTS

Figure 1:
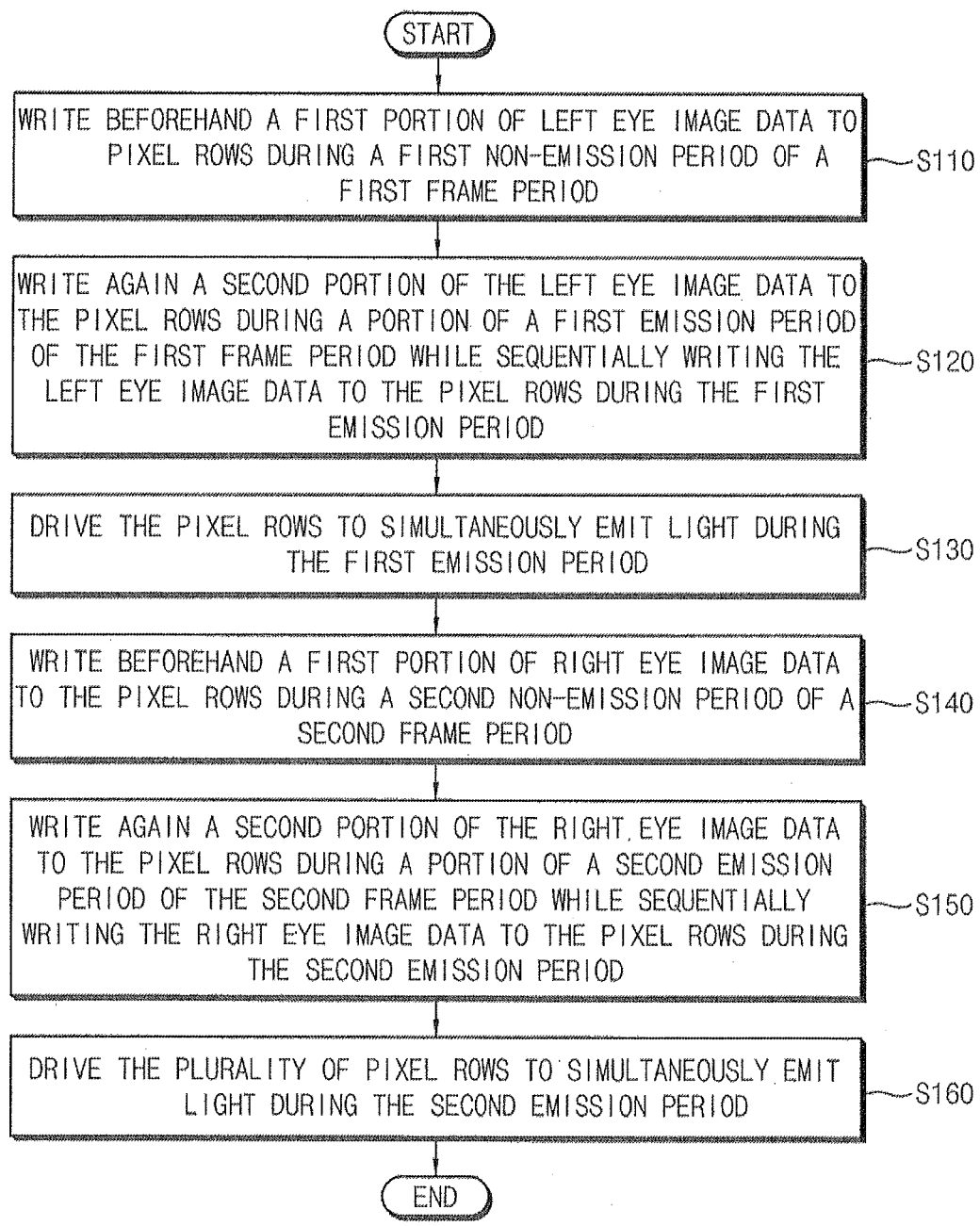
FIG. 1 is a flowchart illustrating a method of displaying a stereoscopic image according to example embodiments.

In shutter glasses, crosstalk between the left eye image and the right eye image can occur since at least a portion of the right eye image can be displayed while the left eye glass of the shutter glasses is open and, similarly, at least a portion of the left eye image can be displayed while the right eye glass of the shutter glasses is open. In addition, in a display device for solving the crosstalk, image quality can be degraded due to swing delay of a low power supply voltage.

The example embodiments are described more fully hereinafter with reference to the accompanying drawings. The described technology can, however, be embodied in many different forms and should not be construed as limited to the example embodiments set forth herein.

It will be understood that when an element or layer is referred to as being "on," "connected to" or "coupled to" another element or layer, it can be directly on, connected or coupled to the other element or layer or intervening elements or layers can be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. can be used herein to describe various elements, components, regions, layers, patterns and/or sections, these elements, components, regions, layers, patterns and/or sections should not be limited by these terms.

The terminology used herein is for the purpose of describing particular example embodiments only and is not intended to be limiting of the described technology. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the described technology.

Unless otherwise defined, all terms (including technical and scientific terms) used herein have the same meaning as commonly understood by one of ordinary skill in the art to which this described technology belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The example embodiments are described more fully hereinafter with reference to the accompanying drawings. Like or similar reference numerals refer to like or similar elements throughout. In this disclosure, the term "substantially" includes the meanings of completely, almost completely or to any significant degree under some applications and in accordance with those skilled in the art. Moreover, "formed on" can also mean "formed over." The term "connected" can include an electrical connection.

FIG. 1 is a flowchart illustrating a method of displaying a stereoscopic image according to example embodiments.

In some embodiments, the FIG. 1 procedure is implemented in a conventional programming language, such as C or C++ or another suitable programming language. The program can be stored on a computer accessible storage medium of the display device 200 (see FIG. 2), for example, a memory (not shown) of the display device 200 or the timing controller 250 (see FIG. 2). In certain embodiments, the storage medium includes a random access memory (RAM), hard disks, floppy disks, digital video devices, compact discs, video discs, and/or other optical storage mediums, etc. The program can be stored in the processor. The processor can have a configuration based on, for example, i) an advanced RISC machine (ARM) microcontroller and ii) Intel Corporation's microprocessors (e.g., the Pentium family microprocessors). In certain embodiments, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 8/7/Vista/2000/9x/ME/XP, Macintosh OS, OS X, OS/2, Android, iOS and the like. In another embodiment, at least part of the procedure can be implemented with embedded software. Depending on the embodiment, additional states can be added, others removed, or the order of the states changed in FIG. 2. The description of this paragraph applies to the embodiments shown in FIGS. 4A-4B and 12A-12B.

Referring to FIG. 1, a method of displaying a stereoscopic image at a display device having a display panel including a plurality of pixel rows is shown In the method, a first portion of left eye image data is written beforehand to the pixel rows during a first non-emission period of a first frame period (S110), and a second portion of the left eye image data is written again to the pixel rows during a portion of a first emission period of the first frame period while sequentially writing the left eye image data to the pixel rows during the first emission period (S120). The second portion of the left eye image data is written during a first emission transition period. By writing again the second portion of the left eye image data to the pixel rows, which is already written during the first emission transition period, band phenomenon that can occur in the left eye image data written during the first emission transition period can be prevented. The band phenomenon refers to when luminance decreases in low grayscale regions.

The pixel rows can substantially simultaneously or concurrently emit light during a first emission time corresponding to the first emission period (S130). While the display device operates in a stereoscopic mode (or a three-dimensional mode), data can be written to the pixel rows in a progressive emission method (e.g., a progressive emission with simultaneous scan (PESS) method), and the pixel rows can emit light in a simultaneous emission method. In some embodiments, the emission or non-emission of the pixel rows can be controlled based on a voltage difference between a high power supply voltage and a low power supply voltage applied to the pixel rows. In other embodiments, the emission or non-emission of the pixel rows can be controlled based on an emission control signal applied to the pixel rows.

A first portion of right eye image data is written beforehand to the pixel rows during a second non-emission period of a second frame period successive to the first frame period (S140), and a second portion of the right eye image data is written again to the pixel rows during a portion of a second emission period of the second frame period while sequentially writing the right eye image data to the pixel rows during the second emission period (S150). By writing again the second portion of the right eye image data to the pixel rows, which is already written during the second emission transition period, the band phenomenon that can occur in the right eye image data can be prevented.

The pixel rows can substantially simultaneously or concurrently emit light during a second emission time corresponding to the second emission period (S160).

Figure 2:
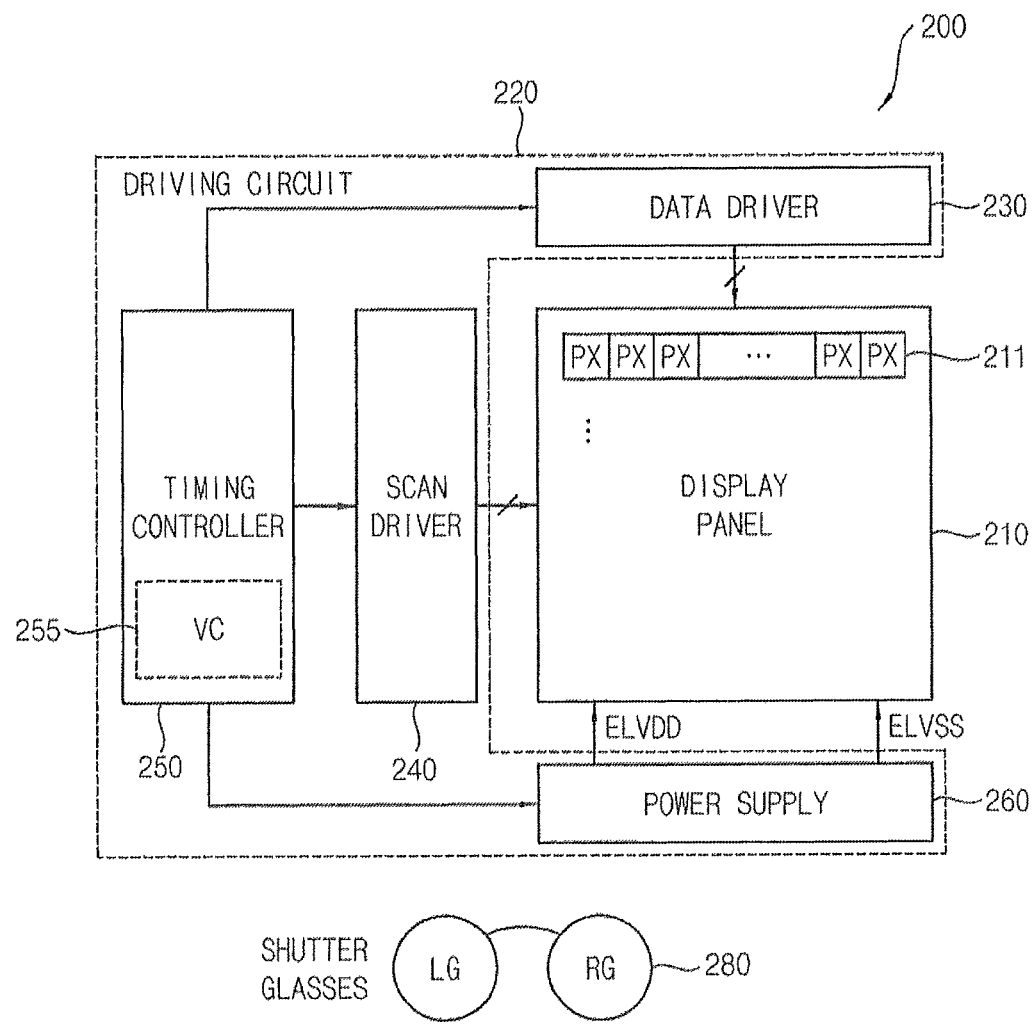
FIG. 2 is a block diagram illustrating a display device displaying a stereoscopic image according to example embodiments.
Figure 3:
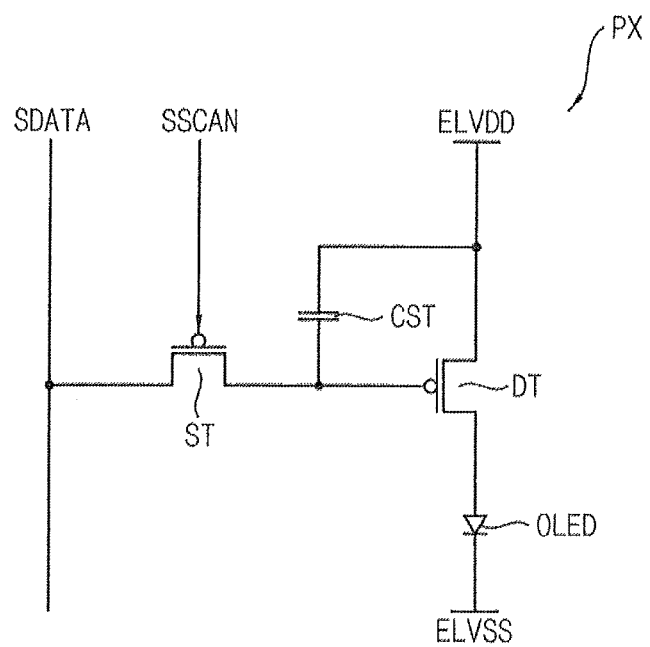
FIG. 3 is a circuit diagram illustrating an example of a pixel included in the display device of FIG. 2.
Figure 4A:
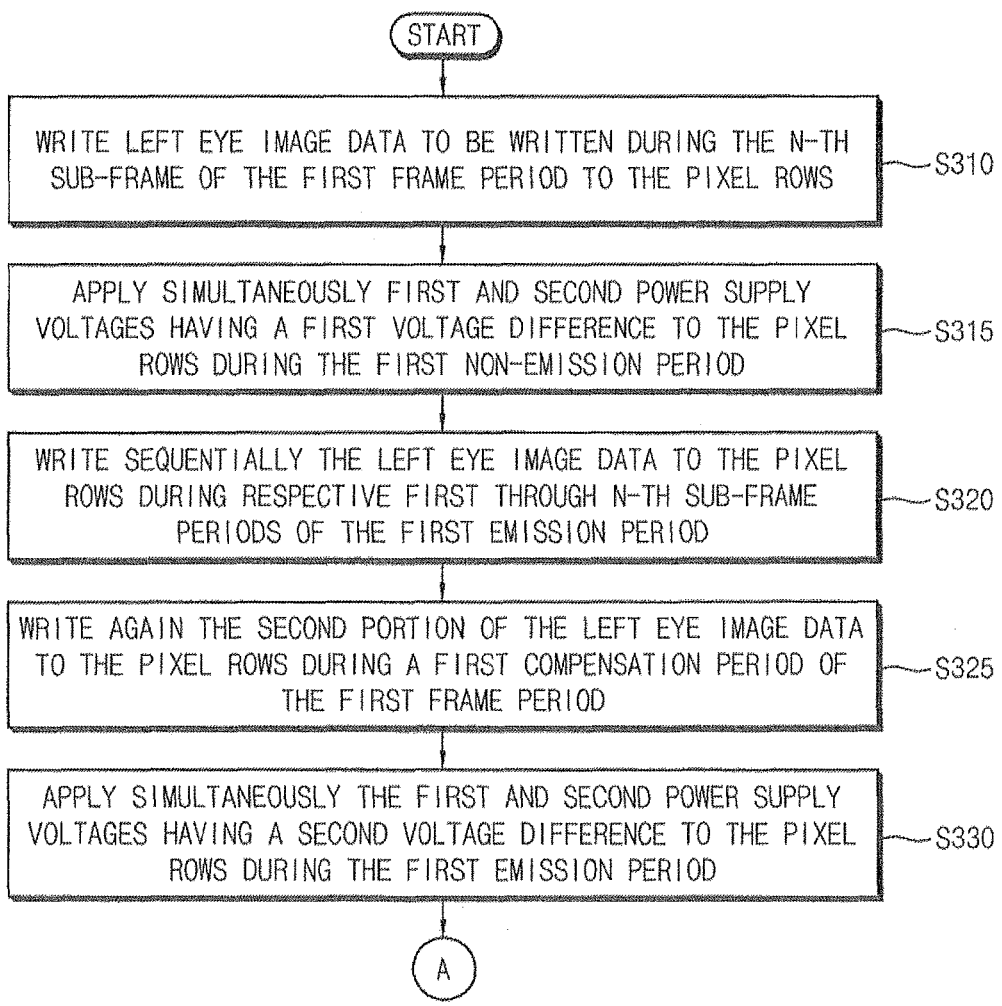
FIGS. 4A and 4B together are a flowchart illustrating a method of displaying a stereoscopic image according to example embodiments.
Figure 4B:
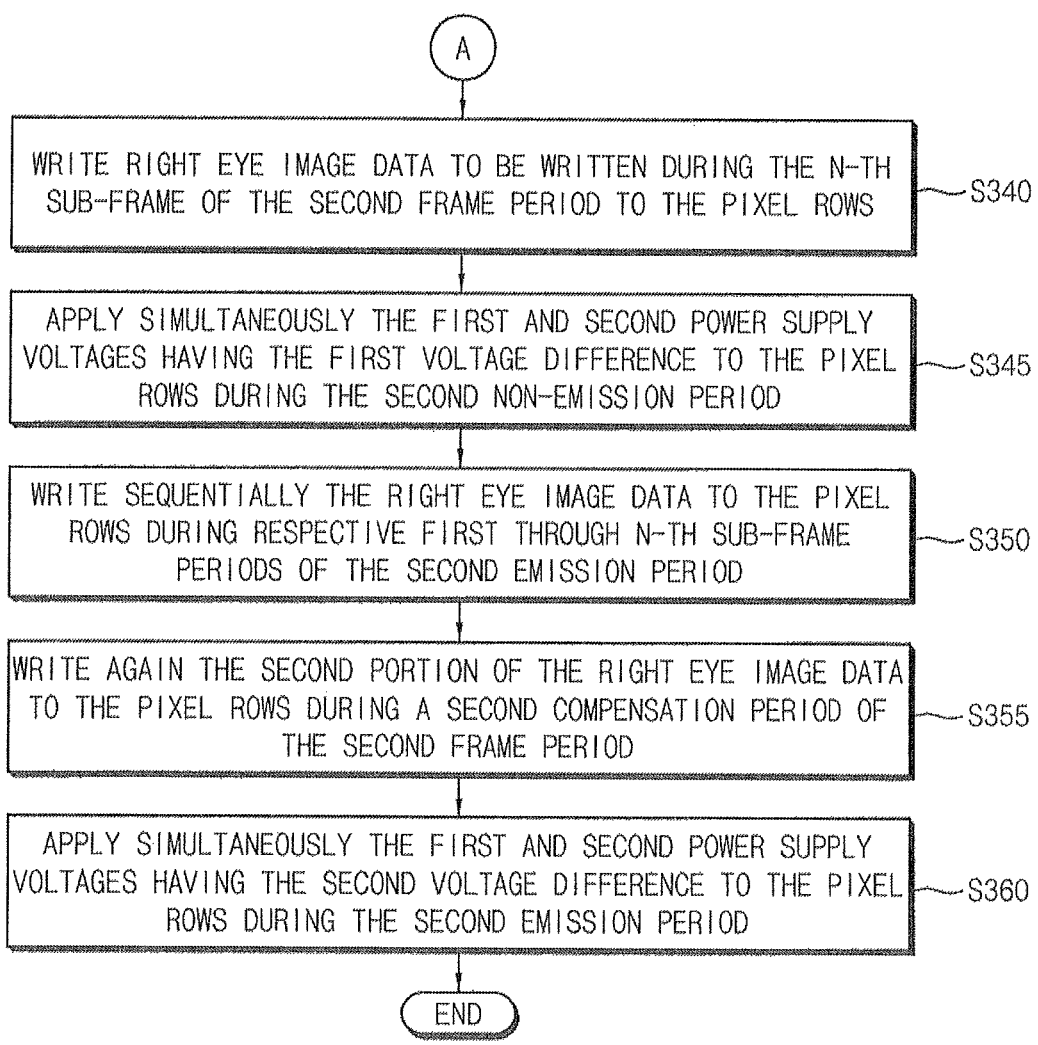
Figure 5:
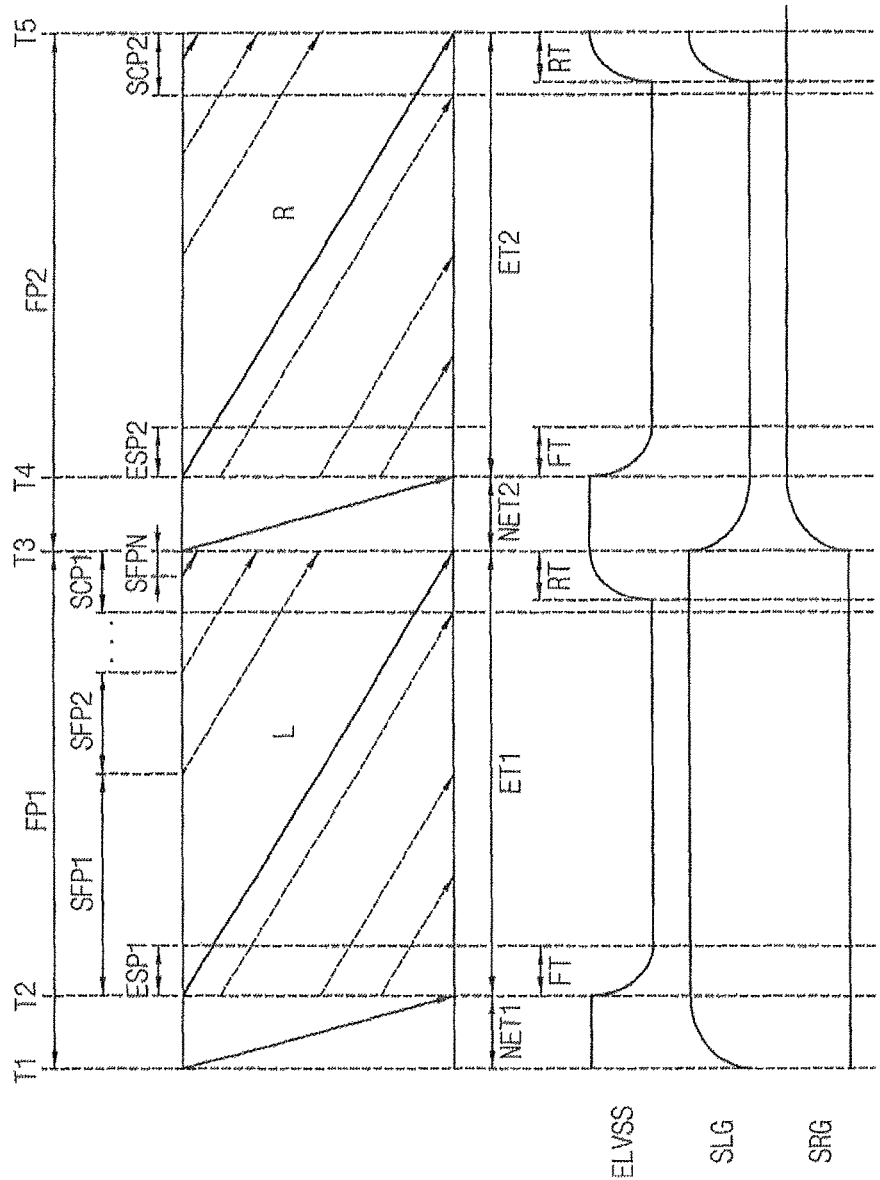
FIG. 5 is a timing diagram for describing an operation of a display device displaying a stereoscopic image according to example embodiments.
Figure 6:
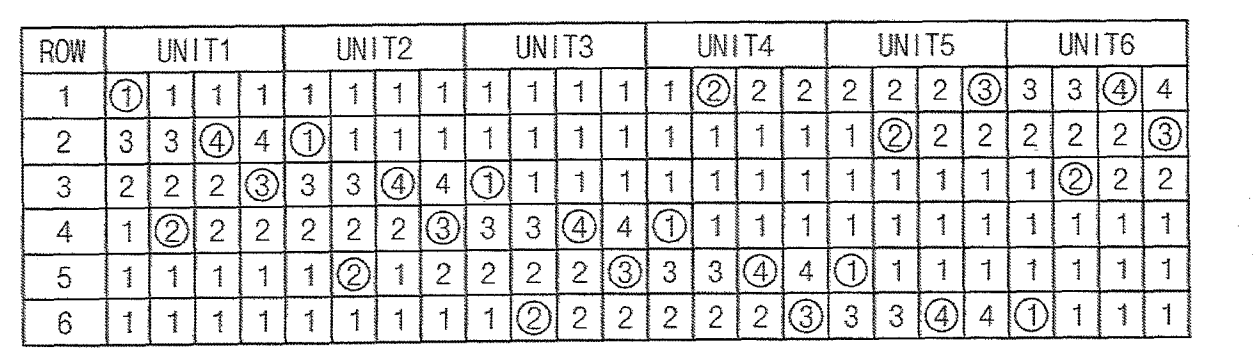

FIG. 2 is a block diagram illustrating a display device displaying a stereoscopic image according to example embodiments. FIG. 3 is a circuit diagram illustrating an example of a pixel included in a display device of FIG. 2. FIGS. 4A and 4B together are a flowchart illustrating a method of displaying a stereoscopic image according to example embodiments. FIG. 5 is a timing diagram for describing an operation of a display device displaying a stereoscopic image according to example embodiments. FIG. 6 is a diagram for describing a method of writing data to pixel rows in a display device according to example embodiments.

Referring to FIG. 2, a display device 200 includes a display panel 210 including a plurality of pixel rows 211, and a driving circuit 220 that drives the display panel 210. The driving circuit 220 can include a data driver 230, a scan driver 240, a timing controller 250 and a power supply 260. The display device 200 can operate in a three-dimensional mode (or a stereoscopic mode) and/or a two-dimensional mode, and can display a stereoscopic image in the three-dimensional mode. In the three-dimensional mode, the display device 200 can operate in synchronization or concurrently with shutter glasses 280.

The display panel 210 can be coupled to the data driver 230 through a plurality of data lines, and can be coupled to the scan driver 240 through a plurality of scan lines. The display panel 210 can include the pixel rows 211. That is, the display panel 210 can include a plurality of pixels PX arranged in a matrix having a plurality of rows and a plurality of columns, and one row of pixels PX coupled to the same scan line can be referred to as one pixel row 211. In some embodiments, the display panel 210 is a self-emitting display panel that emits light without a back light unit. For example, the display panel 210 is an organic light-emitting diode (OLED) display panel.

In some embodiments, as illustrated in FIG. 3, each pixel PX of the display panel 210 can include a switching transistor ST, a storage capacitor CST, a driving transistor DT and an OLED. The switching transistor ST can have a first source/drain terminal coupled to a data line, a second source/drain terminal coupled to the storage capacitor CST, and a gate terminal coupled to the scan line. The switching transistor ST can transfer a data signal SDATA provided from the data driver 230 to the storage capacitor CST in response to a scan signal SSCAN provided from the scan driver 240. The storage capacitor CST can store the data signal SDATA transferred through the switching transistor ST. The driving transistor DT can have a first source/drain terminal coupled to a high power supply voltage or a first power supply voltage ELVDD, a second source/drain terminal coupled to the OLED, and a gate terminal coupled to the storage capacitor CST. The driving transistor DT can be turned on or off according to the data signal SDATA stored in the storage capacitor CST. The OLED can have an anode electrode coupled to the driving transistor DT and a cathode electrode coupled to a low power supply voltage or a second power supply voltage ELVSS. The OLED can emit light based on a current flowing from the high power supply voltage ELVDD to the low power supply voltage ELVSS while the driving transistor DT is turned on. This simple structure of each pixel PX, or a 2T1C structure including two transistors ST and DT and one capacitor CST, can be suitable for a large sized display device.

The driving circuit 220 can include the data driver 230, the scan driver 240 and the timing controller 250. In some embodiments, the timing controller 250 includes a voltage controller 255.

The data driver 230 can apply a data signal (e.g., a signal corresponding to left eye image data, a signal corresponding to right eye image data, a signal corresponding to a portion of the left eye image, or a signal corresponding to a portion of the right eye image) to the display panel 210 through the data lines, and the scan driver 240 can apply a scan signal to the display panel 210 through the scan lines. The timing controller 250 can control an operation of the display device 200. For example, the timing controller 250 provides predetermined control signals to the data driver 230 and the scan driver 240 to control the operation of the display device 200. In some embodiments, the data driver 230, the scan driver 240 and the timing controller 250 are implemented as one integrated circuit (IC). In other embodiments, the data driver 230, the scan driver 240 and the timing controller 250 are implemented as two or more integrated circuits.

The driving circuit 220 can further include the power supply 260. The power supply 260 can supply the display panel 210 with a first power supply voltage (e.g., the high power supply voltage ELVDD) and a second power supply voltage (e.g., the low power supply voltage ELVSS). In some embodiments, the power supply 260 controls the emission or non-emission of the display panel 210 by adjusting at least one selected from the high power supply voltage ELVDD and the low power supply voltage ELVSS. The power supply 260 can provide the pixel rows 211 with the high and low power supply voltages ELVDD and ELVSS having a first voltage difference such that the pixel rows 211 do not emit light during a non-emission time. The power supply 260 can also provide the pixel rows 211 with the high and low power supply voltages ELVDD and ELVSS having a second voltage difference greater than the first voltage difference such that the pixel rows 211 emit light during an emission time. For example, the first voltage difference is about 0V, and the second voltage difference is a voltage difference enough to allow the OLED to emit light.

Hereinafter, a method of displaying a stereoscopic image at the display panel 200 will be described below with reference to FIGS. 4A through 6.

Referring to FIGS. 2, 4A, 4B and 5, the driving circuit 220 drives the display panel 210 by dividing one frame period (e.g., FP1) into a plurality of sub-frame periods SFP1, SFP2 and SFPN. A first frame period FP1 can include a first non-emission period NET1 from T1 and T2 and a first emission period ET1 from T2 to T3, and a second frame period FP2 can include a second non-emission period NET2 from T3 and T4 and a second emission period ET2 from T5 to T5.

The driving circuit 220 can write in advance a portion of left eye image data L to be written during the N-th sub-frame of the first frame period FP1 to the pixel rows 211 during the first non-emission period NET1 of the first frame period FP1 (S310). The driving circuit 220 can apply first and second power supply voltages ELVDD and ELVSS having a first voltage difference to the pixel rows 211 during the first non-emission period NET1 such that the pixel rows 211 do not emit light (S315). Here, a frame period can be shifted (e.g., by one unit time in a PESS method) according to the pixel rows 211. For example, the first frame period FP1 is a time period from a first time point T1 to a second time point T2 with respect to a pixel row (e.g., the most upper pixel row) on which a data write operation or a scan operation is performed first.

In some embodiments, to control the substantially simultaneous or concurrent emission/non-emission of the pixel rows 211, the driving circuit 220 can adjust a voltage level of at least one selected from the high power supply voltage ELVDD and the low power supply voltage ELVSS. In some embodiments, to allow the pixel rows 211 not to emit light, the driving circuit 220 increases the low power supply voltage ELVSS to a high voltage level at a start time point of the first non-emission time NET1. That is, the driving circuit 220 can apply the low power supply voltage ELVSS having the high voltage level substantially simultaneously or concurrently to the pixel rows 211 during the first non-emission time NET1 corresponding to the first frame period FP1 (S420). In other embodiments, to allow the pixel rows 211 not to emit light, the driving unit 220 decreases the high power supply voltage ELVDD to a low voltage level at the start time point of the first non-emission time NET1.

The driving circuit 220 can sequentially write the left eye image data L to the pixel rows 211 during respective first through N-th sub-frame periods SFP1-SFPN (N is a natural number greater than one) of the first emission period ET1 (S320). For example, the driving circuit 220 writes again the second portion of the left eye image data L to the pixel rows 211 during a first compensation period SCP1 of the first frame period FP1 (S325). The second portion of the left eye image data L is already written to the pixel rows 211 during a first emission transition period ESP1 of the first frame period FP1. The driving circuit 220 can apply the first and second power supply voltages ELVDD and ELVSS having a second voltage difference greater than the first voltage difference to the pixel rows 211 during the first emission period ET1 such that the pixel rows 211 emit light (S330). The driving circuit 220 can lower the low power supply voltage ELVSS to the low voltage level at a start time point of the first emission period ET1 and can increase the low power supply voltage ELVSS to the high voltage level in the first compensation period SCP1.

While the display panel 210 displays the left eye image based on the left eye image data L1, the display device 200 or an electronic device including the display device 200 can provide a left eye glass control signal having a first logic level to the shutter glasses 280 such that the left eye glass LG of the shutter glasses 280 (i.e., state of the left eye glass LG of the shutter glasses 280 SLG) is in an open state during the first emission period ET1. In some embodiments, the display device 200 or the electronic device performs wired or wireless communication with the shutter glasses 280 to provide the left eye glass control signal. To ensure that the left eye glass LG of the shutter glasses 280 is in an open state at a start time point of the first emission period ET1, or at the second time point T2, the left eye glass control signal having the first logic level can be transferred to the shutter glasses 280 before the second time point T2. Accordingly, during the first emission period ET1, the display panel 210 can display the left eye image based on the left eye image data L1, and the left eye glass LG of the shutter glasses 280 can be open, thereby providing the left eye image to a left eye of a user.

The driving circuit 220 can write in advance right eye image data R to be written during the N-th sub-frame of the second frame period FP2 to the pixel rows 211 during the second non-emission period NET2 of the second frame period FP2 (S340). The driving circuit 220 can apply first and second power supply voltages ELVDD and ELVSS having the first voltage difference to the pixel rows 211 during the second non-emission period NET2 such that the pixel rows 211 do not emit light (S345).

The driving circuit 220 can sequentially write the right eye image data R to the pixel rows 211 during respective first through N-th sub-frame periods SFP1-SFPN (N is a natural number greater than two) of the second emission period ET2 (S350). For example, the driving circuit 220 writes again the second portion of the right eye image data R to the pixel rows 211 during a second compensation period SCP2 of the second frame period FP2 (S355). The second portion of the right eye image data R is already written to the pixel rows 211 during a second emission transition period ESP2 of the first frame period FP2. The driving circuit 220 can apply the first and second power supply voltages ELVDD and ELVSS having the second voltage difference to the pixel rows 211 during the second emission period ET2 such that the pixel rows 211 emit light (S360).

While the display panel 210 displays the right eye image based on the right eye image data R, the display device 200 or an electronic device including the display device 200 can provide a right eye glass control signal having a first logic level to the shutter glasses 280 such that the right eye glass RG of the shutter glasses 280 (i.e., state of the right eye glass RG of the shutter glasses 280, SRG) is in an open state during the second emission period ET2. In some embodiments, the display device 200 or the electronic device performs wired or wireless communication with the shutter glasses 280 to provide the right eye glass control signal. To ensure that the right eye glass RG of the shutter glasses 280 is in the open state at a start time point of the second emission period ET2, or at the second fourth point T4, the right eye glass control signal having the first logic level can be transferred to the shutter glasses 280 before the fourth time point T4. Accordingly, during the second emission period ET2, the display panel 210 can display the right eye image based on the right eye image data R, and the right eye glass RG of the shutter glasses 280 can be open, thereby providing the right eye image to a left eye of a user.

Each of the first emission transition period ESP1 and the second emission transition period ESP2 can correspond to a falling time FT during which the low power supply voltage ELVSS falls from the high voltage level to the low voltage level. Each of the first compensation period SCP1 and the second compensation period SCP2 can at least include a rising time RT during which the low power supply voltage ELVSS rises from the low voltage level to the high voltage level.

Since image data written to the pixel rows 211 before the low power supply voltage ELVSS falling below a threshold voltage of the OLED during the falling time FT does not represent corresponding luminance, the band phenomenon can occur in a portion of the display panel 210. To prevent occurrence of the band phenomenon, the driving circuit 220 can write again the second portion of image data which is already written during each of the first emission transition period ESP1 and the second emission transition period ESP2 to the pixel rows 211 during each of the first compensation period SCP1 and the second compensation period SCP2, and the timing controller 250 can adjust a start time point of the rising time of the low power supply voltage ELVSS.

In some embodiments, the left eye image data L at the first frame period FP1 and the right eye image data R at the second frame period FP2 are written in a progressive emission with simultaneous scan (PESS) method. For example, at the display device 200, as illustrated in FIG. 6, a time period corresponding to one frame period is divided into a plurality of unit times UNIT1, UNIT2, UNIT3, UNIT4, UNIT5 and UNIT6 according to a vertical resolution of the display panel 210. Thus, the number of the unit times UNIT1 to UNIT6 corresponding to one frame period can be the number of scan lines included in the display panel 210 or the number of the pixel rows 211. Further, each unit time UNIT1 to UNIT6 can be divided into a plurality of partial times, and the number of the partial times included in one unit time can be the number of the sub-frame periods SFP1, SFP2 and SFPN included in one frame period. FIG. 6 illustrates an example where a display panel includes 6 pixel rows, and one frame includes 4 sub-frames. Accordingly, in the example of FIG. 6, the time period corresponding to one frame period is divided into 6 unit times UNIT1 to UNIT6 and each unit time UNIT1 to UNIT6 is divided into 4 partial times. In this case, data corresponding different sub-frames can be written to different pixel rows at the partial times of each unit time UNIT1 to UNIT6, respectively, and data corresponding to each sub-frame can be sequentially written to the 6 pixel rows while being delayed by one unit time with respect to the respective pixel rows. In this PESS method, since the respective data write times for all pixel rows are distributed throughout a time period corresponding to one frame period, each data write time can be sufficiently obtained. Accordingly, the PESS method can be suitable for the large sized display device having high resolution.

Figure 7:
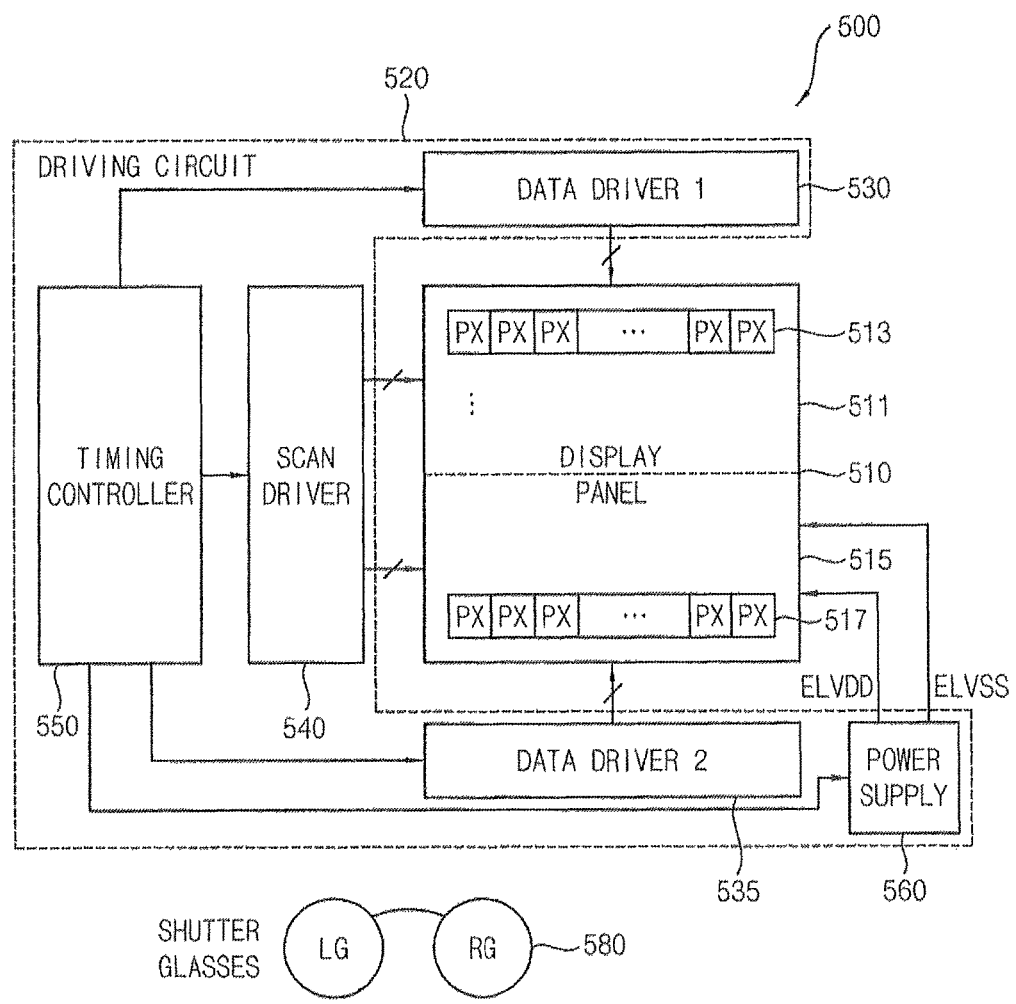
FIG. 7 is a block diagram illustrating a display device displaying a stereoscopic image according to example embodiments.
Figure 8:
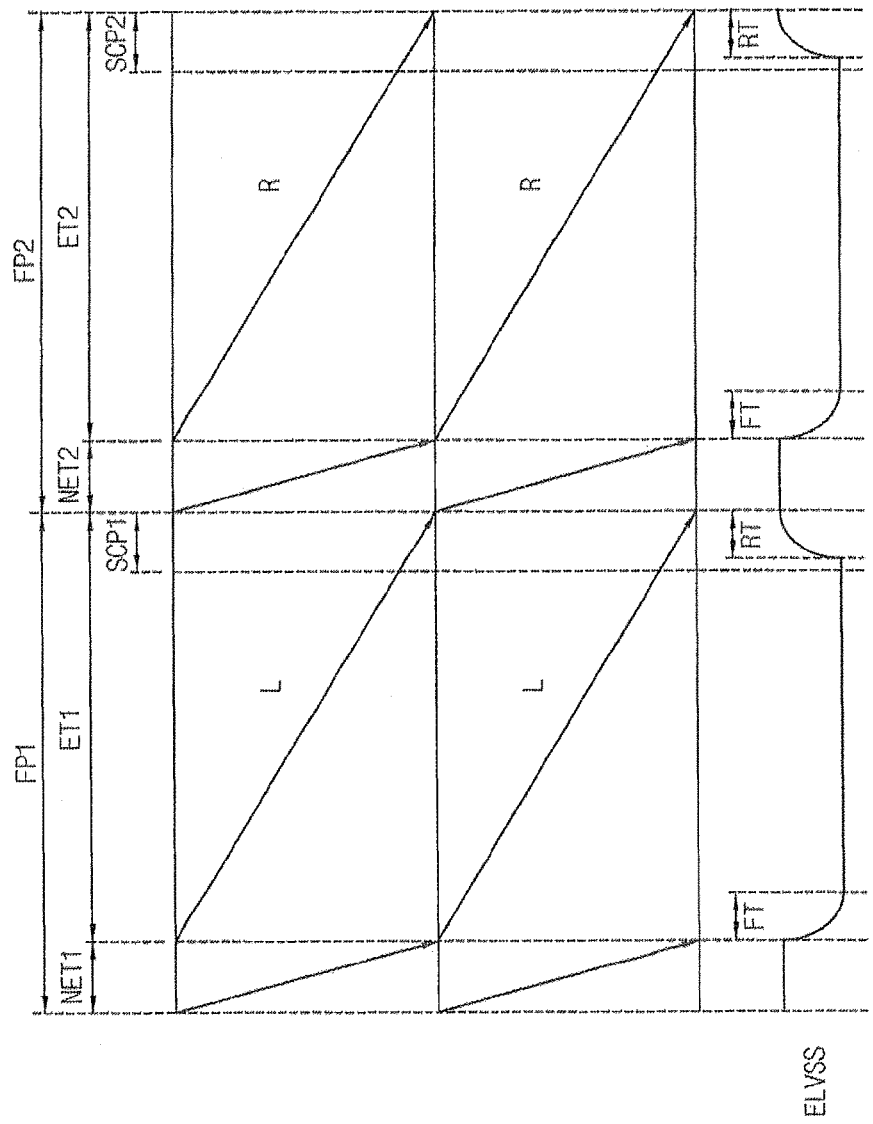
FIG. 8 is a timing diagram for describing an operation of a display device displaying a stereoscopic image according to example embodiments.
Figure 9:
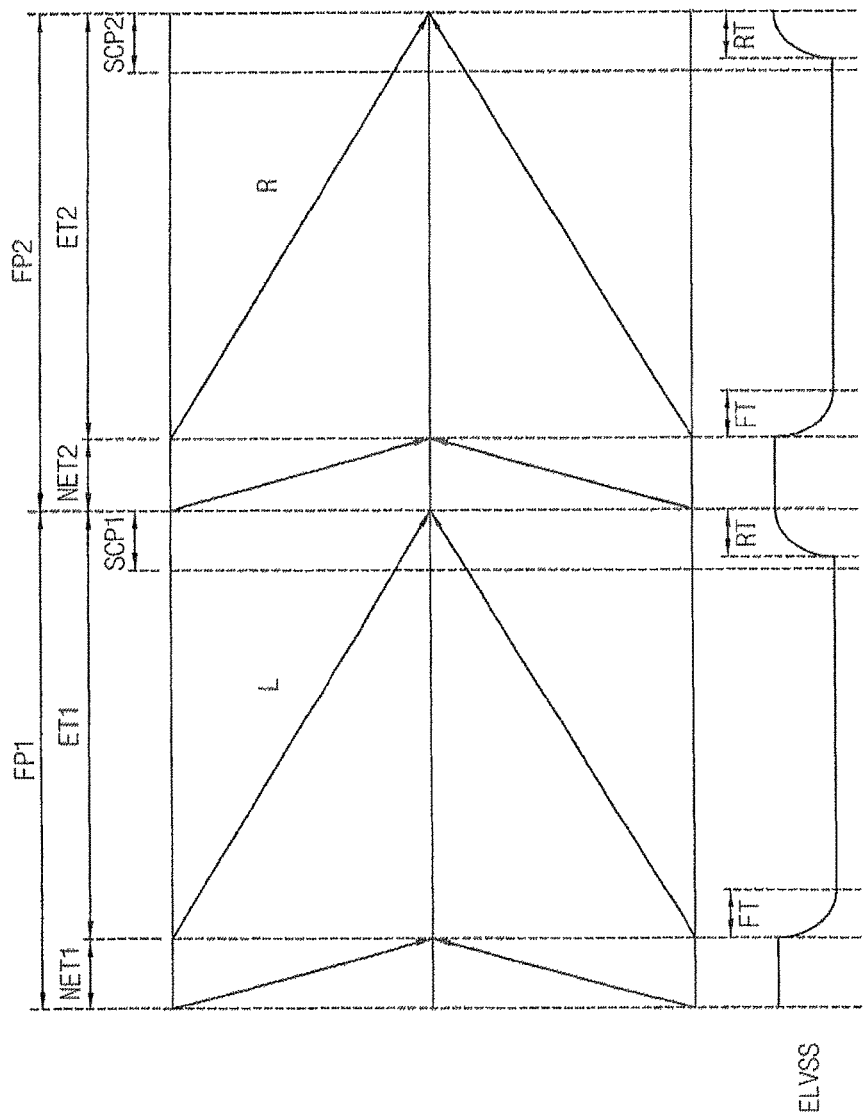
FIG. 9 is a timing diagram for describing an operation of a display device displaying a stereoscopic image according to example embodiments.

FIG. 7 is a block diagram illustrating a display device displaying a stereoscopic image according to example embodiments. FIG. 8 is a timing diagram for describing an operation of a display device displaying a stereoscopic image according to example embodiments. FIG. 9 is a timing diagram for describing an operation of a display device displaying a stereoscopic image according to example embodiments.

Referring to FIG. 7, a display device 500 includes a display panel 510 including a plurality of pixel rows 513 and 517, and a driving circuit 520 that drives the display panel 510. The driving circuit 520 can include first and second data drivers 530 and 535, a scan driver 540, a timing controller 550 and a power supply 560. The display device 500 can operate in a three-dimensional mode (or a stereoscopic mode) and/or a two-dimensional mode, and can display a stereoscopic image in the three-dimensional mode. In the three-dimensional mode, the display device 500 can operate in synchronization with shutter glasses 580. The display device 500 can have a similar configuration to a display device 200 of FIG. 2, except that the display device 500 can include two data drivers 530 and 535 and that the display panel 510 can include upper and lower display panels 511 and 515 that are driven by the different data drivers 530 and 535, respectively.

The display panel 510 can be divided into the upper display panel 511 including upper pixel rows 513 and the lower display panel 515 including lower pixel rows 517. The upper pixel rows 513 can receive data signals from the first data driver 530, and the lower pixel rows 517 can receive data signals from the second data driver 535. Thus, the upper pixel rows 513 can be respectively driven by different data drivers 530 and 535. In some embodiments, the scan driver 540 provides scan signals to the upper display panel 511 and the lower display panel 515, respectively. In other embodiments, the display device 500 includes two scan drivers providing the scan signals to the upper display panel 511 and the lower display panel 515, respectively.

In some embodiments, as illustrated in FIG. 8, the driving circuit 520 sequentially writes data (a portion of left eye image data, left eye image data L, a portion of right eye image data, right eye image data R) to the upper pixel rows 513 in a first direction from top to bottom of the upper display panel 511, and can sequentially write data to the lower pixel rows 517 in the first direction from top to bottom of the lower display panel 515. For example, the first data driver 530 writes the portion of the left eye image data to the upper pixel rows 513 in the first direction during a first non-emission period NET1 of a first frame period FP1. Then, the first data driver 530 can write again a portion of the left eye image data, already written during a first emission transition period, to the upper pixel rows 513 during a first compensation period SCP1, while sequentially writing the left eye image data L to the upper pixel rows 513 in the first direction during a first emission period ET1. Then, the first data driver 530 can write the portion of the right eye image data to the upper pixel rows 513 in the first direction during a second non-emission period NET2 of a second frame period FP2, and write again a portion of the right eye image data, already written during a first emission transition period, to the upper pixel rows 513 during a second compensation period SCP2, while sequentially writing the right eye image data R to the upper pixel rows 513 in the first direction during a second emission period ET2.

For example, the second data driver 535 writes the portion of the left eye image data to the lower pixel rows 517 in the first direction during the first non-emission period NET1. Then, the second data driver 535 can write again a portion of the left eye image data, already written during the first emission transition period, to the lower pixel rows 517 during the first compensation period SCP1, while sequentially writing the left eye image data L to the lower pixel rows 517 in the first direction during the first emission period ET1. Then, the second data driver 535 can write the portion of the right eye image data to the lower pixel rows 517 in the first direction during the second non-emission period NET2, and write again a portion of the right eye image data, already written during the first emission transition period, to the lower pixel rows 517 during the second compensation period SCP2, while sequentially writing the right eye image data R to the lower pixel rows 517 in the first direction during the second emission period ET2.

In other embodiments, as illustrated in FIG. 9, the driving circuit 520 sequentially writes data to the upper pixel rows 513 in the first direction from top to bottom of the upper display panel 511, and can sequentially write data to the lower pixel rows 517 in a second direction from bottom to top of the lower display panel 515 opposite to the first direction. This data write operation or this scan operation performed in directions from the top and the bottom of the display panel 510 to the center of the display panel 510 can be referred to as a "Chevron scanning."

Although FIGS. 8 and 9 illustrate examples of data write directions or scan directions, the data write directions or scan directions of the display device according to example embodiments are not limited thereto.

Figure 10:
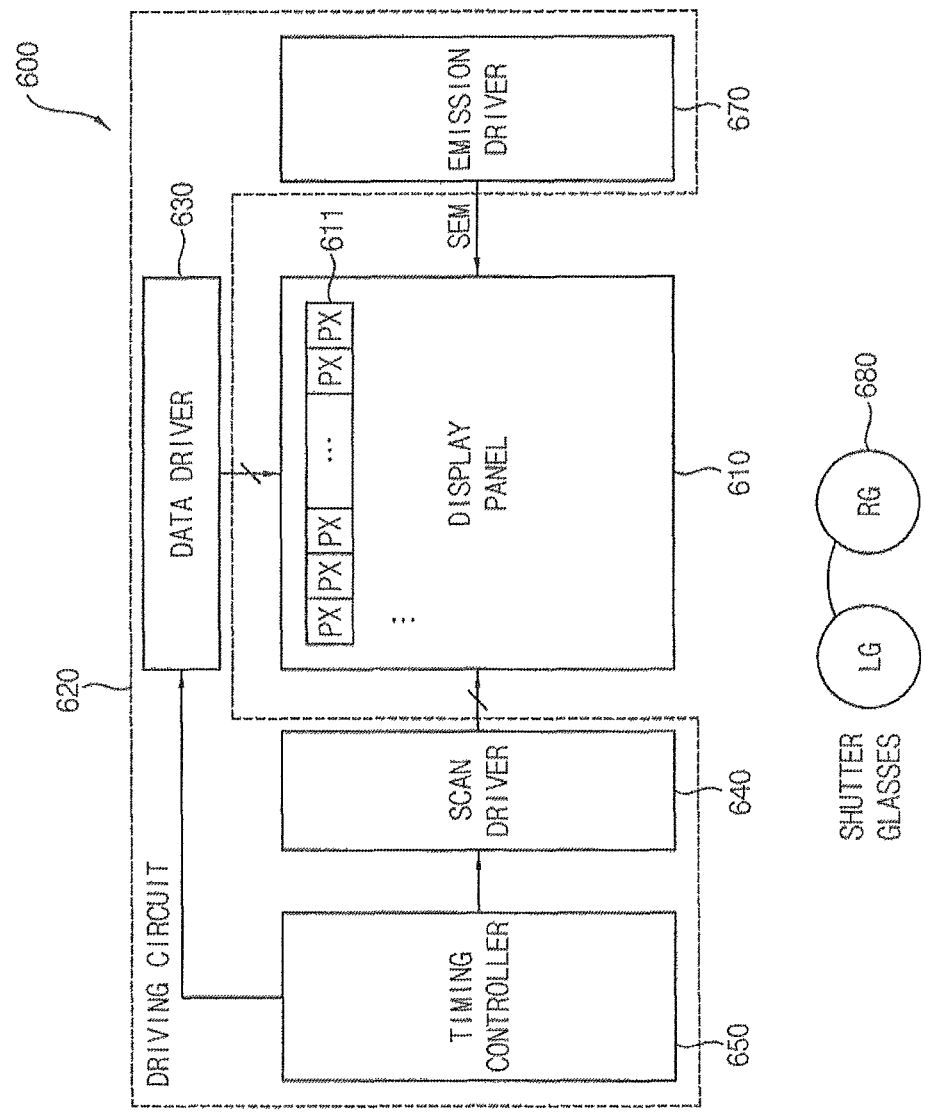
FIG. 10 is a block diagram illustrating a display device displaying a stereoscopic image according to example embodiments.
Figure 11:
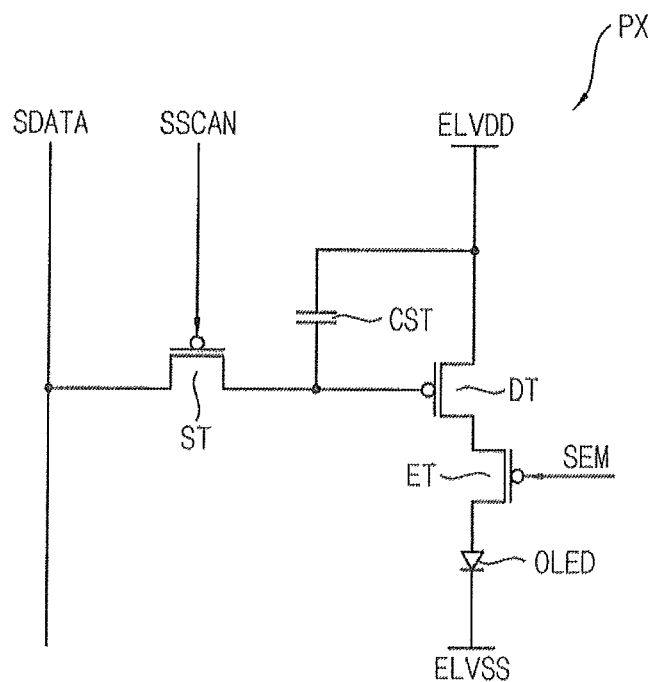
FIG. 11 is a circuit diagram illustrating an example of a pixel included in a display device of FIG. 10.
Figure 12A:
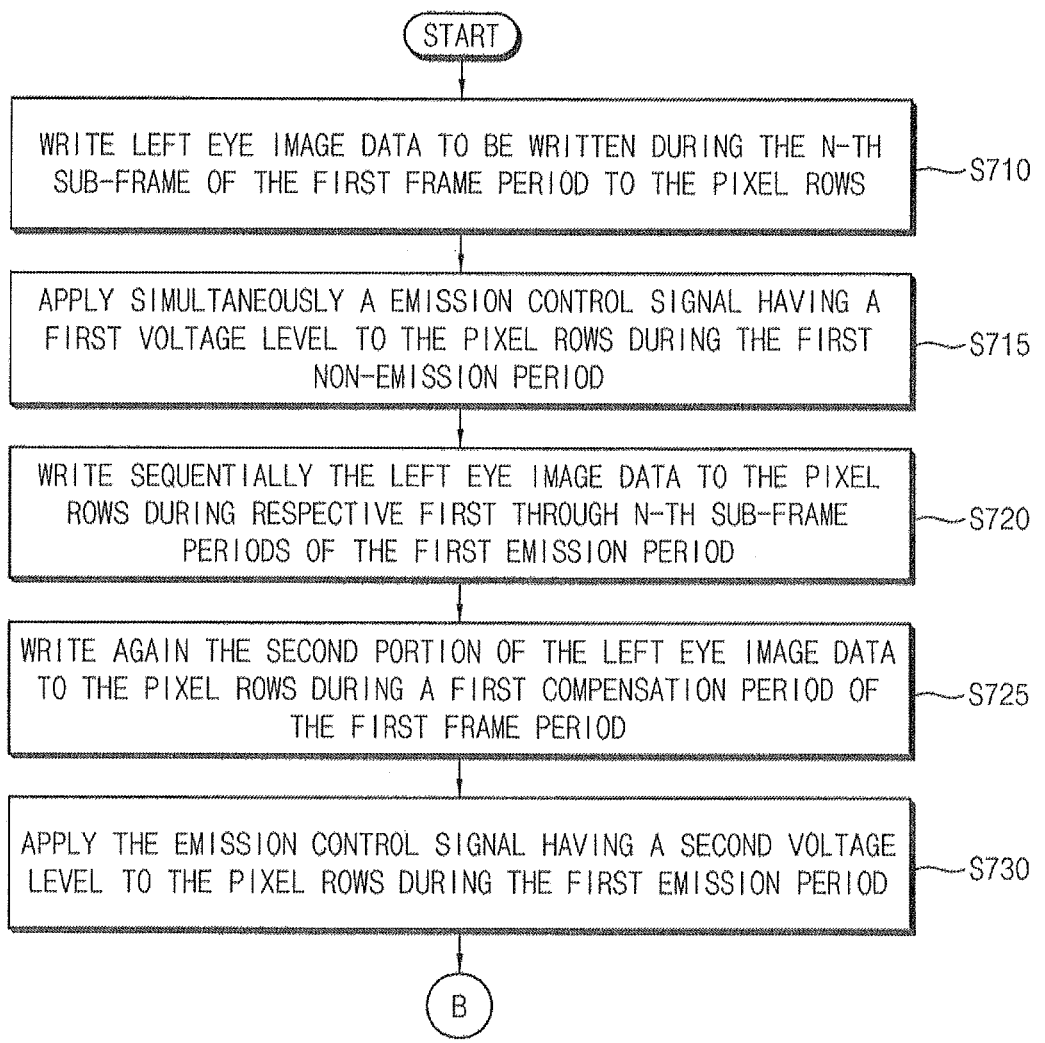
FIGS. 12A and 12B together are a flowchart illustrating a method of displaying a stereoscopic image according to example embodiments.
Figure 12B:
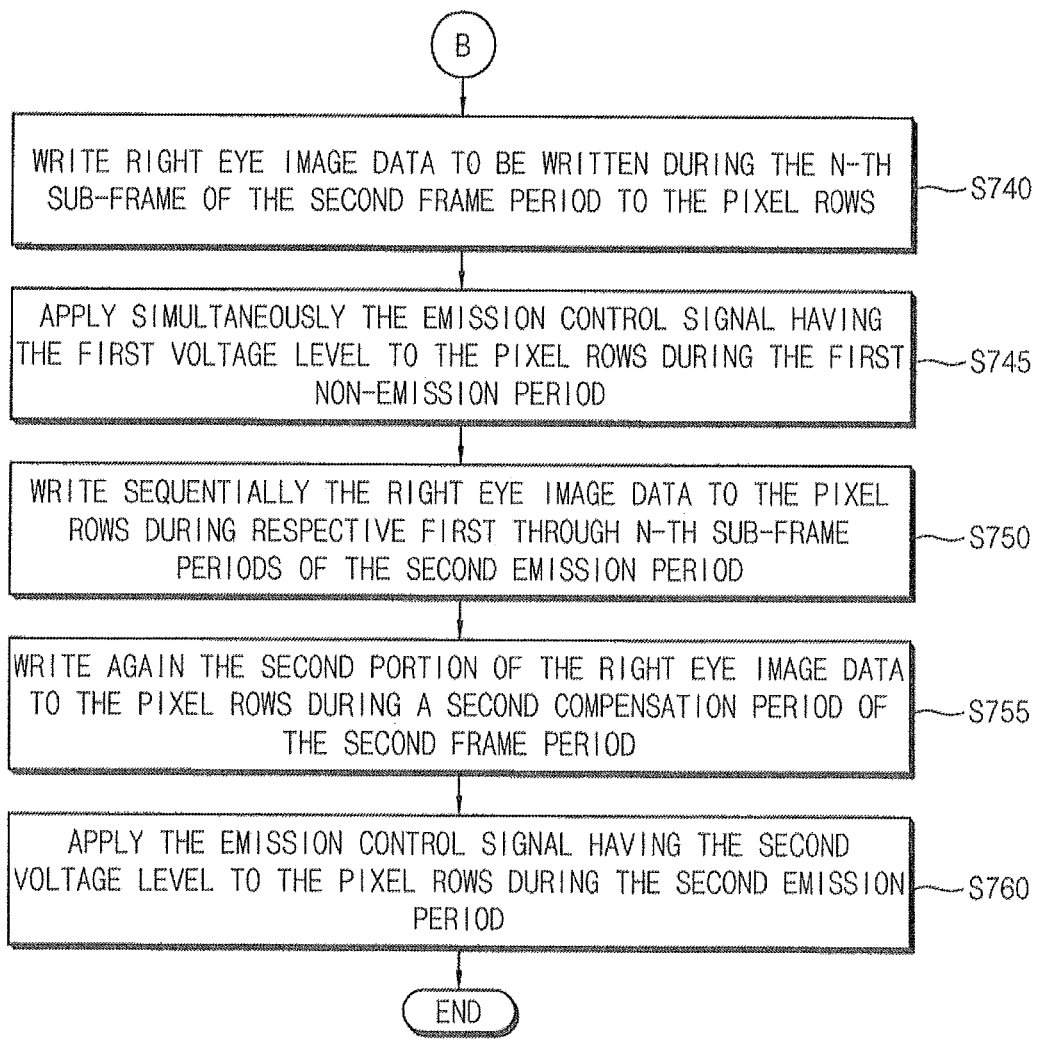
Figure 13:
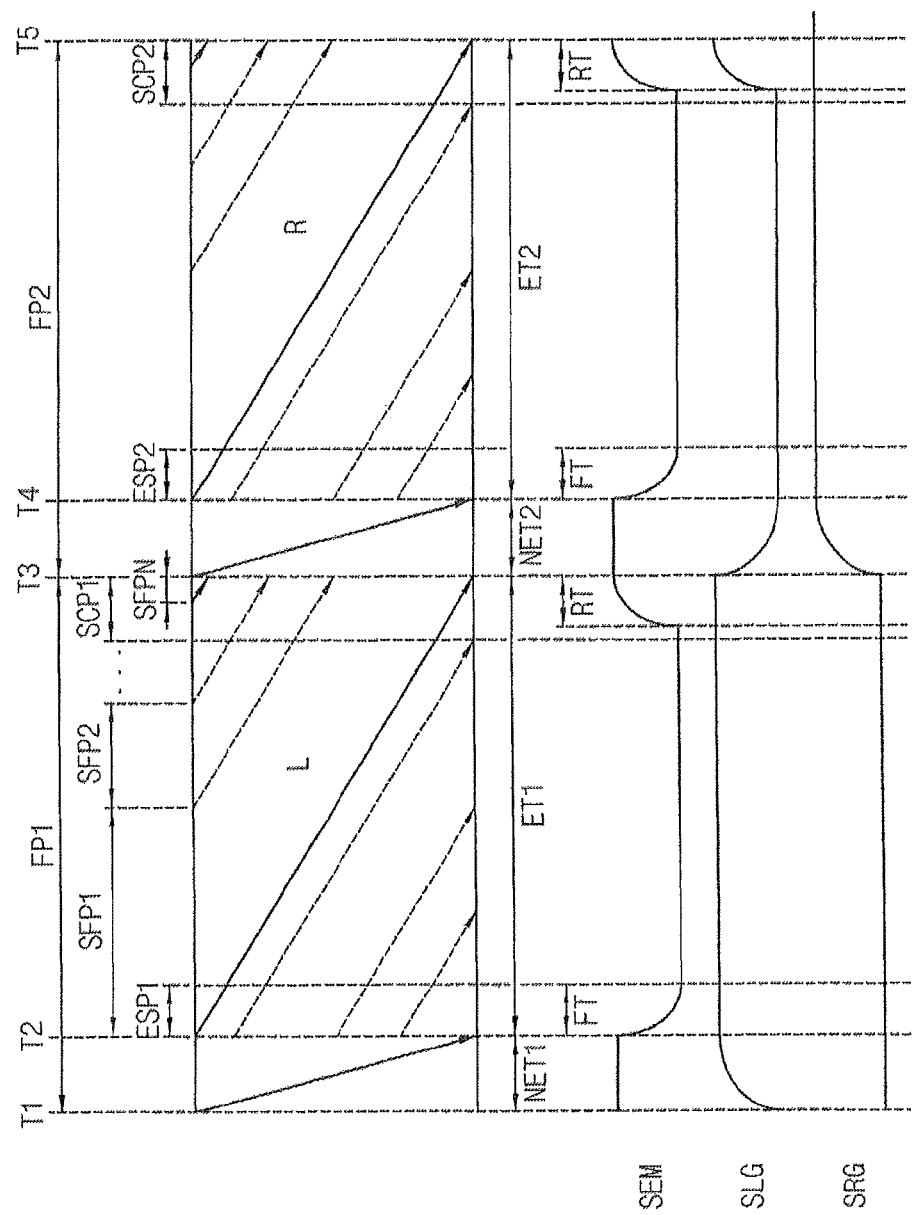
FIG. 13 is a timing diagram for describing an operation of a display device displaying a stereoscopic image according to example embodiments.

FIG. 10 is a block diagram illustrating a display device displaying a stereoscopic image according to example embodiments. FIG. 11 is a circuit diagram illustrating an example of a pixel included in a display device of FIG. 10. FIGS. 12A and 12B together are a flowchart illustrating a method of displaying a stereoscopic image according to example embodiments. FIG. 13 is a timing diagram for describing an operation of a display device displaying a stereoscopic image according to example embodiments.

Referring to FIG. 10, a display device 600 includes a display panel 610 including a plurality of pixel rows 611, and a driving circuit 620 that drives the display panel 610. The driving circuit 620 can include a data driver 630, a scan driver 640, a timing controller 650 and an emission control driver 670. The display device 600 can operate in a three-dimensional mode (or a stereoscopic mode) and/or a two-dimensional mode, and can display a stereoscopic image in the three-dimensional mode. In the three-dimensional mode, the display device 600 can operate in synchronization with shutter glasses 680. The display device 600 can have a similar configuration to the display device 200 of FIG. 2 except that the display device 600 can include the emission control driver 670 and that each pixel PX includes an emission control transistor. Although it is not illustrated in FIG. 10, the display device 600 can further include a power supply providing high and low power supply voltages to the display panel 610.

The emission control driver 670 can substantially simultaneously or concurrently apply an emission control signal SEM to all pixels PX included in the display panel 610 to control the all pixels PX to substantially simultaneously or concurrently emit or not emit light. For example, the emission control driver 670 substantially simultaneously or concurrently applies the emission control signal SEM having a first voltage level to the all pixels PX during a non-emission time such that the all pixels PX do not emit light, and substantially simultaneously or concurrently applies the emission control signal SEM having a second voltage level to the all pixels PX during an emission time such that the all pixels PX substantially simultaneously or concurrently emit light.

Each pixel PX can emit or not emit light in response to the emission control signal SEM. In some embodiments, as illustrated in FIG. 11, each pixel PX includes a switching transistor ST, a storage capacitor CST, a drive transistor DT, an emission control transistor ET and an OLED. For example, the emission control transistor ET is turned off in response to the emission control signal SEM having the first voltage level, and is turned on in response to the emission control signal SEM having the second voltage level. The OLED can emit light based on a current flowing from the high power supply voltage ELVDD to the low power supply voltage ELVSS while the drive transistor DT and the emission control transistor ET are turned on.

Hereinafter, a method of displaying a stereoscopic image at the display panel 600 will be described below with reference to FIGS. 12A through 13. The method of displaying the stereoscopic image illustrated in FIGS. 12A and 12B is similar to a method of displaying a stereoscopic image illustrated in FIGS. 4A and 4B, except that the emission/non-emission of the display panel 610 is controlled not by a power supply voltage (e.g., the low power supply voltage ELVSS) but by the emission control signal SEM.

Referring to FIGS. 10, 12A, 12B and 13, the driving circuit 620 drives the display panel 610 by dividing one frame period (e.g., FP1) into a plurality of sub-frame periods SFP1, SFP2 and SFPN. A first frame period FP1 can include a first non-emission period NET1 from T1 and T2 and a first emission period ET1 from T2 to T3, and a second frame period FP2 can include a second non-emission period NET2 from T3 and T4 and a second emission period ET2 from T5 to T5.

The driving circuit 620 can write in advance a portion of left eye image data L to be written during the N-th sub-frame of the first frame period FP1 to the pixel rows 611 during the first non-emission period NET1 of the first frame period FP1 (S710). The driving circuit 620 can apply the emission control signal SEM having a first logic level substantially simultaneously or concurrently to the pixel rows 611 during the first non-emission period NET1 such that the pixel rows 611 do not emit light (S715). For example, when the emission control transistor included in each pixel PX is a PMOS transistor, the first voltage level is a high voltage level.

The driving circuit 620 can sequentially write the left eye image data L to the pixel rows 611 during respective first through N-th sub-frame periods SFP1-SFPN (N is a natural number greater than one) of the first emission period ET1 (S720). For example, the driving circuit 620 writes again the second portion of the left eye image data L to the pixel rows 611 during a first compensation period SCP1 of the first frame period FP1 (S725). The second portion of the left eye image data L is already written to the pixel rows 611 during a first emission transition period ESP1 of the first frame period FP1. The driving circuit 620 can apply the emission control signal SEM having a second logic level substantially simultaneously or concurrently to the pixel rows 611 during the first emission period ET1 such that the pixel rows 611 emit light (S730). During the first emission period ET1, the display panel 610 can display a left eye image based on the left eye image data L, and a left eye glass LG of the shutter glasses 680 can be open, thereby providing the left eye image to a left eye of a user.

The driving circuit 620 can write in advance a portion of right eye image data R to be written during the N-th sub-frame of the second frame period FP2 to the pixel rows 611 during the second non-emission period NET2 of the second frame period FP2 (S740). The driving circuit 620 can apply the emission control signal SEM having a first logic level substantially simultaneously or concurrently to the pixel rows 611 during the second non-emission period NET2 such that the pixel rows 611 do not emit light (S745).

The driving circuit 620 can sequentially write the right eye image data R to the pixel rows 611 during respective first through N-th sub-frame periods SFP1-SFPN (N is a natural number greater than one) of the second emission period ET2 (S750). For example, the driving circuit 620 writes again a second portion of the right eye image data R to the pixel rows 611 during a second compensation period SCP2 of the second frame period FP2 (S755). The second portion of the right eye image data R is already written to the pixel rows 611 during a second emission transition period ESP2 of the second frame period FP2. The driving circuit 620 can apply the emission control signal SEM having the second logic level substantially simultaneously or concurrently to the pixel rows 611 during the second emission period ET2 such that the pixel rows 611 emit light (S760). During the second emission period ET2, the display panel 610 can display a right eye image based on the right eye image data R, and a right eye glass RG of the shutter glasses 680 can be open, thereby providing the left eye image to a right eye of a user.

Each of the first emission transition period ESP1 and the second emission transition period ESP2 can correspond to a falling time FT during which the emission control signal SEM falls from the first voltage level to the second voltage level. Each of the first compensation period SCP1 and the second compensation period SCP2 can at least include a rising time RT during which the emission control signal SEM rises from the second voltage level to the first voltage level.

Since image data written to the pixel rows 611 before the emission control signal SEM falling below a threshold voltage of the OLED during the falling time FT does not represent corresponding luminance, the band phenomenon can occur in a portion of the display panel 610. To prevent occurrence of the band phenomenon, the driving circuit 620 can write again the second portion of image data which is already written during each of the first emission transition period ESP1 and the second emission transition period ESP2 to the pixel rows 611 during each of the first compensation period SCP1 and the second compensation period SCP2, and the emission control driver 670 can adjust a start time point of the rising time of emission control signal SEM.

The voltage level change of the emission control signal SEM at an end time point of the first emission time ET1 or an time point of the second emission time ET2 can be delayed by a transition time (e.g., a rising time RT) of the emission control signal SEM from the second voltage level to the first voltage level. However, in the display device 600 according to example embodiments, since the black data BD are written to the portion of the pixel rows 611 during the portion PP of the first frame period FP1 or the portion of the third frame period FP3, crosstalk during the transition time (or the rising time RT) of the emission control signal SEM is prevented.

Figure 14:
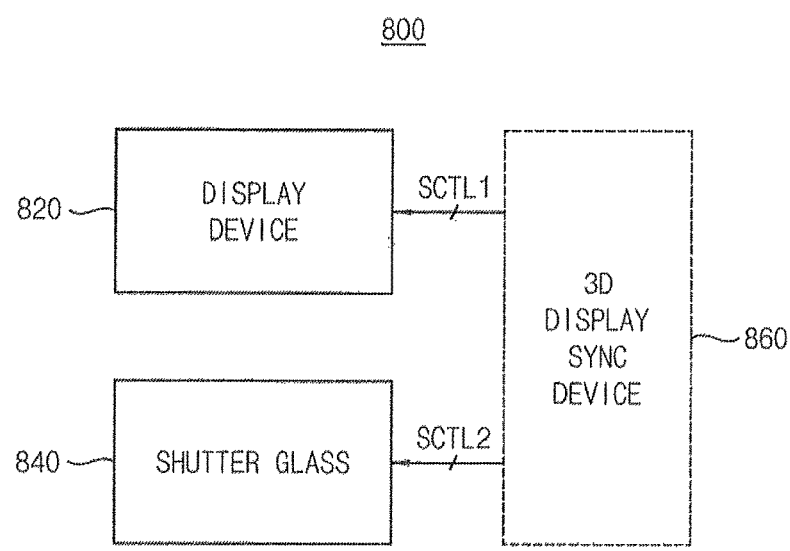
FIG. 14 is a block diagram illustrating a stereoscopic image display system according to example embodiments.
Figure 15:
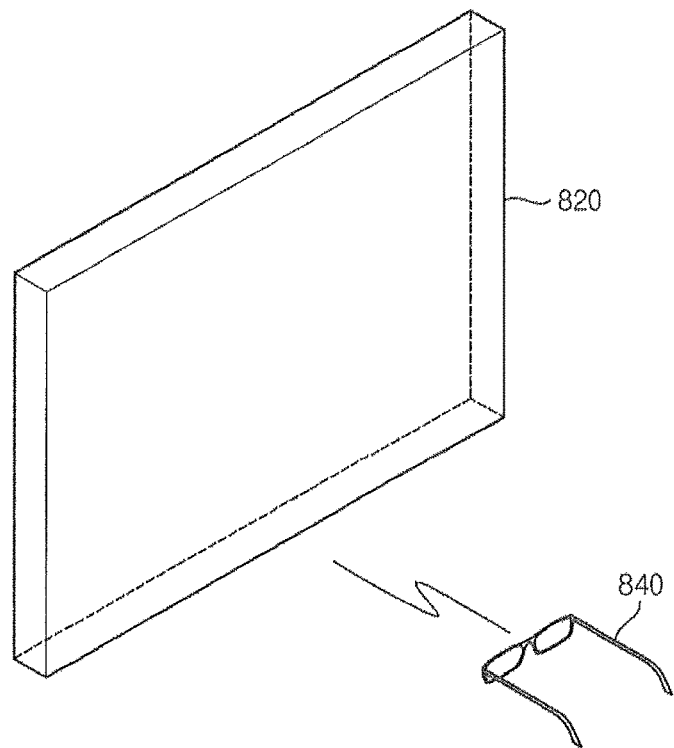
FIG. 15 is a conceptual diagram illustrating the stereoscopic image display system of FIG. 14.

FIG. 14 is a block diagram illustrating a stereoscopic image display system according to example embodiments. FIG. 15 is a conceptual diagram illustrating the stereoscopic image display system of FIG. 14.

Referring to FIGS. 14 and 15, the stereoscopic image display system 800 includes an electoluminescent display device 820, shutter glasses 840, and a stereoscopic display synchronization device 860. Although FIG. 14 illustrates stereoscopic image synchronization device 860 is located outside the electoluminescent display device 820 and the shutter glasses 840, the described technology is not limited thereto. For example, the stereoscopic display synchronization device 860 can be located within the electoluminescent display device 820 or the shutter glasses 840.

The electoluminescent display device 820 can selectively operate in the two-dimensional mode displaying the planar images or in the three-dimensional mode displaying the stereoscopic images in response to synchronization control signals SCTL1 and SCTL2. As described above, the electoluminescent display device 820 can write in advance a portion of the image data during a non-emission period, and can write again image data, written already during an emission transition period, during a compensation period while sequentially writing the image data during an emission period without overwriting the same image data during two consecutive frame periods. Therefore, the electoluminescent display device 820 can display the stereoscopic images while maintaining a number of sub-frames and can prevent the occurrence of the band phenomenon that a luminance decreases in a portion of the display panel.

The shutter glasses 840 can open/close a left shutter and a right shutter in synchronization with the left image frame and the right image frame, respectively based on the synchronization control signal SCTL1 and SCTL2. Specifically, the shutter glasses 840 can open the left shutter (i.e., close the right shutter) when the electroluminescent display device 820 displays the left image frame, and can open the right shutter (i.e., close the left shutter) when the electroluminescent display device 820 displays the right image frame.

For this operation, the stereoscopic display synchronization device 860 can provide the synchronization control signals SCTL1 and SCTL2 to the electroluminescent display device 820 and the shutter glasses 840, respectively, so that the shutter glasses 840 can open the left shutter (i.e., close the right shutter) when the electroluminescent display device 820 displays the left image frame and the shutter glasses 840 can open the right shutter (i.e., close the left shutter) when the electroluminescent display device 820 displays the right image frame. In some embodiments, the stereoscopic display synchronization device 860 provides the synchronization control signals SCTL1 and SCTL2 to the electroluminescent display device 820 and the shutter glasses 840, respectively, by wire and/or wireless communication links.

Figure 16:
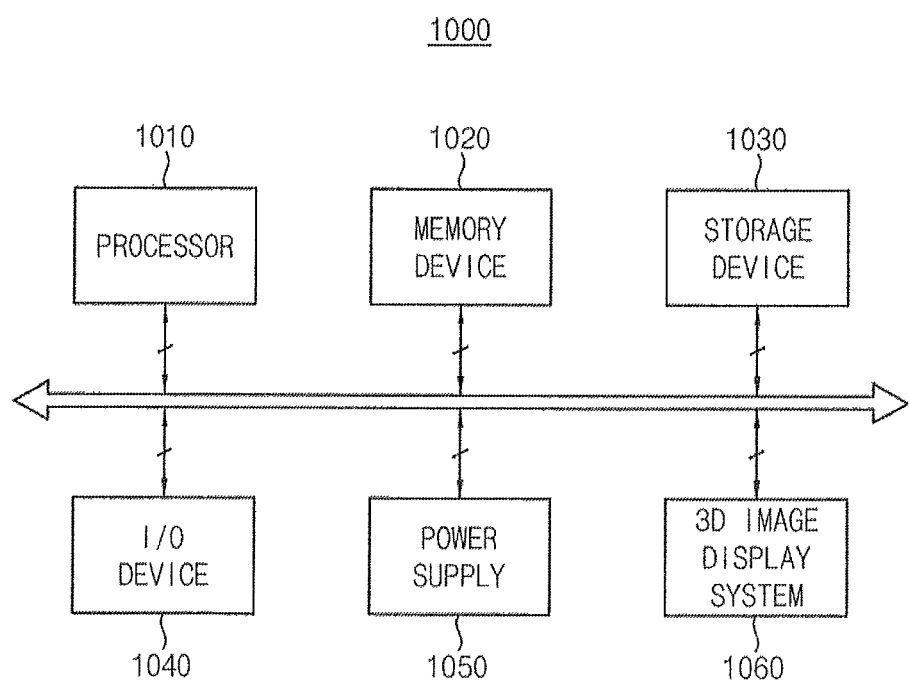
FIG. 16 is a block diagram illustrating an electronic device including the stereoscopic image display system of FIG. 14.

FIG. 16 is a block diagram illustrating an electronic device including the stereoscopic image display system of FIG. 14.

Referring to FIG. 16, an electronic device 1000 includes a processor 1010, a memory device 1020, a storage device 1030, an input/output (I/O) device 1040, a power supply 1050, and a stereoscopic (3D) image display system 1060. The stereoscopic image display system 1060 can correspond to the stereoscopic image display system 800 of FIG. 14. In addition, the electronic device 1000 can further include a plurality of ports for communicating a video card, a sound card, a memory card, a universal serial bus (USB) device, other electronic devices, etc.

The processor 1010 can perform various computing functions. The processor 1010 can be a microprocessor, a central processing unit (CPU), etc. The processor 1010 can be coupled to other components via an address bus, a control bus, a data bus, etc. Further, the processor 1010 can be coupled to an extended bus, such as a peripheral component interconnection (PCI) bus. The memory device 1020 can store data for operations of the electronic device 1000. For example, the memory device 1020 includes at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device, such as a dynamic random access memory (DRAM) device, a static random access memory (SRAM) device, a mobile dynamic random access memory (mobile DRAM) device, etc. The storage device 1030 can be a solid state drive (SSD) device, a hard disk drive (HDD) device, a CD-ROM device, etc.

The I/O device 1040 can be an input device such as a keyboard, a keypad, a mouse, a touchpad, a touch-screen, a remote controller, etc., and an output device such as a printer, a speaker, etc. In some embodiments, the stereoscopic image display system 1060 can be included in the I/O device 1040. The power supply 1050 can provide a power for operations of the electronic device 1000. The stereoscopic image display system 1060 can communicate with other components via the buses or other communication links.

As described above with reference to FIG. 14, the stereoscopic image display system 1060 includes an electroluminescent display device such as an OLED display, shutter glasses, and a stereoscopic display synchronization device. The electoluminescent display device can write in advance a portion of the image data during a non-emission period, and can write again image data, written already during an emission transition period, during a compensation period while sequentially writing the image data during an emission period without overwriting same image data during two consecutive frame periods. Therefore, the electoluminescent display device can display the stereoscopic images while maintaining a number of sub-frames and can prevent the occurrence of the band phenomenon that a luminance decreases in a portion of the display panel.

In example embodiments, the electronic device 1000 is a television, a computer monitor, a laptop, a digital camera, a cellular phone, a smartphone, a personal digital assistant (PDA), a portable multimedia player (PMP), a MP3 player, a navigation system, a video phone, etc.

The described technology can be applied to any display device or any electronic device including a display device displaying a stereoscopic image. For example, the described technology is applied to televisions, computer monitors, laptop computers, digital cameras, cellular phones, smartphones, personal digital assistants (PDAs), portable multimedia players (PMPs), MP3 players, navigation systems, video phones, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive technology. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of displaying a stereoscopic image at a display device having a display panel including a plurality of pixel rows, the method comprising:
   first providing a first portion of left eye image data to a plurality of pixel rows during a first non-emission period of a first frame period, wherein the first frame period includes a first emission period having a first emission transition period and a first compensation period;
   second providing a second portion of the left eye image data to the pixel rows during the first emission transition period while sequentially providing the left eye image data to the pixel rows during the first emission period;
   third providing the second portion of the left eye image data to the pixel rows during the first compensation period;
   driving the pixel rows to concurrently emit light during the first emission period;
   fourth providing a first portion of right eye image data to the pixel rows during a second non-emission period of a second frame period, wherein the second frame period includes a second emission period having a second emission transition period and a second compensation period;
   fifth providing a second portion of the right eye image data to the pixel rows during the second emission transition period while sequentially providing the right eye image data to the pixel rows during the second emission period;
   sixth providing the second portion of the right eye image data to the pixel rows during the second compensation period; and
   driving the pixel rows to concurrently emit light during the second emission period.

2. The method of claim 1, wherein the first and second emission transition periods correspond to a transition time from non-emission to emission respectively in the first and second frame periods.

3. The method of claim 1, wherein the display device is configured divide each of the first and second frame periods into first through N-th sub-frame periods, where N is an integer greater than 1,
   wherein the first providing includes:
      providing left eye image data to be written during the N-th sub-frame of the first frame period to the pixel rows during the first non-emission period; and
      applying concurrently first and second power supply voltages having a first voltage difference to the pixel rows during the first non-emission period such that the pixel rows do not emit light, and
   wherein the fourth providing includes:
      providing right eye image data to be written during the N-th sub-frame of the second frame period to the pixel rows; and
      applying concurrently the first and second power to the pixel rows during the second non-emission period such that the pixel rows do not emit light.

4. The method of claim 3, wherein sequentially providing the left eye image data to the pixel rows during the first emission period includes sequentially providing the left eye image data to the pixel rows during first through N-th sub-frame periods of the first emission period, and
   wherein sequentially providing the right eye image data to the pixel rows during the second emission period includes sequentially providing the right eye image data to the pixel rows during first through N-th sub-frame periods of the second emission period.

5. The method of claim 3, wherein driving the pixel rows to concurrently emit light during the first emission period includes applying concurrently the first and second power supply voltages having a second voltage difference greater than the first voltage difference to the pixel rows during the first emission period such that the pixel rows emit light, and
   wherein driving the pixel rows to concurrently emit light during the second emission period includes concurrently applying the first and second power supply voltages having the second voltage difference to the pixel rows during the second emission period such that the pixel rows emit light.

6. The method of claim 5, wherein the display device further includes a power supply configured to supply the first and second power supply voltages, and
   wherein power supply is configured to i) lower the second power supply voltage from a first voltage level to a second voltage level less than the first voltage level at the beginning of the first emission period, and ii) lower the second power supply voltage from the first voltage level to the second voltage level at the beginning of the second emission period.

7. The method of claim 6, wherein each of the first and second emission transition periods corresponds to a falling time during which the second power supply voltage is lowered from the first voltage level to the second voltage level.

8. The method of claim 6, wherein each of the first and second compensation periods includes at least a rising time during which the second power supply voltage rises from the second voltage level to the first voltage level.

9. The method of claim 1, wherein the display device is configured to divide each of the first and second frame periods into first through N-th sub-frame periods, where N is an integer greater than 1,
   wherein the first providing includes:

providing left eye image data to be written during the N-th sub-frame of the first frame period to the pixel rows; and applying concurrently an emission control signal having a first voltage level to the pixel rows during the first non-emission period such that the pixel rows do not emit light, and wherein the fourth providing includes:

providing right eye image data to be written during the N-th sub-frame of the second frame period to the pixel rows; and applying concurrently the emission control signal having the first voltage level to the pixel rows during the second non-emission period such that the pixel rows do not emit light.

10. The method of claim 9, wherein driving the pixel rows to concurrently emit light during the first emission period includes applying the emission control signal having a second voltage level different from the first voltage level to the pixel rows during the first emission period such that the pixel rows emit light, and wherein driving the pixel rows to concurrently emit light during the second emission period includes applying the emission control signal having the second voltage level to the pixel rows during the second emission period such that the pixel rows emit light.

11. The method of claim 10, wherein each of the first and second emission transition periods corresponds to a first transition time during which the emission control signal transitions from the first voltage level to the second voltage level.

12. The method of claim 10, wherein each of the first and second compensation periods includes at least a second transition time during which the emission control signal transitions from the second voltage level to the first voltage level.

13. The method of claim 1, wherein the display panel includes an upper display panel having upper pixel rows of the pixel rows and a lower display panel having lower pixel rows of the pixel rows, and wherein the upper and lower display panels are configured to be respectively driven based on different data drivers.

14. The method of claim 13, wherein the first portion of the left eye image data, the left eye image data, the first portion of the right eye image data and the right eye image data are configured to be sequentially written to the upper pixel rows in a first direction extending from a top to a bottom of the upper display panel, and wherein the first portion of the left eye image data, the left eye image data, the first portion of the right eye image data and the right eye image data are configured to be sequentially written to the lower pixel rows in the first direction.

15. The method of claim 13, wherein the first portion of the left eye image data, the left eye image data, the first portion of the right eye image data and the right eye image data are configured to be sequentially written to the upper pixel rows in a first direction from a top to a bottom of the upper display panel, and wherein the first portion of the left eye image data, the left eye image data, the first portion of the right eye image data and the right eye image data are configured to be sequentially written to the upper pixel rows in a second direction from a bottom to a top of the lower display panel.

16. The method of claim 1, wherein at least the left and right eye image data are written to the pixel rows in a progressive emission with simultaneous scan (PESS) method.

17. A display device comprising:
a display panel including a plurality of pixel rows; and
a driving circuit configured to:
provide left eye image data to the pixel rows during a first non-emission period of a first frame period, wherein the first frame period includes a first emission period having a first emission transition period;
concurrently provide a portion of the left eye image data to the pixel rows during the first emission transition period and sequentially provide the left eye image data to the pixel rows during the first emission period;
drive the pixel rows to concurrently emit light during the first emission period;
provide right eye image data to the pixel rows during a second non-emission period of a second frame period, wherein the second frame period includes a second emission period having a second emission transition period;
concurrently provide a portion of the right eye image data to the pixel rows during the second emission transition period and sequentially provide the right eye image data to the pixel rows during the second emission period; and
drive the pixel rows to concurrently emit light during the second emission period.

18. The display device of claim 17, wherein each of the first and second emission transition periods corresponds to a transition time from non-emission to emission of the display panel.

19. The display device of claim 17, wherein the driving circuit includes a power supply configured to:
apply first and second power supply voltages having a first voltage difference to the pixel rows during each of the first and second non-emission periods such that the pixel rows do not emit light; and
apply the first and second power supply voltages having a second voltage difference greater than the first voltage difference to the pixel rows during each of the first and second emission periods such that the pixel rows emit light, and
wherein the driving circuit is further configured to adjust a start time point of a rising time of the second power supply voltage during which the portions of the left and right eye image data are respectively written again to the pixel rows.

20. The display device of claim 17, wherein the driving circuit includes an emission control driver configured to:
apply concurrently a emission control signal having a first voltage level to the pixel rows during each of the first and second non-emission periods such that the pixel rows do not emit light; and
apply the emission control signal having a second voltage level different from the first voltage level to the pixel rows during each of the first and second emission periods such that the pixel rows emit light, and
wherein the driving circuit is further configured to adjust a start time point of a rising time of the emission control signal during which the portions of the left and right eye image data are respectively written again to the pixel rows.

* * * * *